United States Patent [19]

Appell et al.

[11] 4,084,224
[45] Apr. 11, 1978

[54] SYSTEM OF CONTROLLING PROCEDURE EXECUTION USING PROCESS CONTROL BLOCKS

[75] Inventors: Marc Appell, Paris; John J. Bradley, Garches, both of France; Benjamin S. Franklin, Cambridge, Mass.

[73] Assignee: Compagnie Honeywell Bull, Paris, France

[21] Appl. No.: 529,018

[22] Filed: Dec. 2, 1974

[30] Foreign Application Priority Data

Nov. 30, 1973  France ................................ 73 42690

[51] Int. Cl.$^2$ ............................................. G06F 9/18
[52] U.S. Cl. ............................................. 364/200
[58] Field of Search ................. 340/172.5; 445/1; 364/200 MS, 900 MS

[56] References Cited

U.S. PATENT DOCUMENTS

| | | | |
|---|---|---|---|
| 3,559,187 | 1/1971 | Figueroa et al. | 340/172.5 |
| 3,573,852 | 4/1971 | Watson et al. | 340/172.5 |
| 3,593,314 | 7/1971 | Moll | 340/172.5 |
| 3,614,746 | 10/1971 | Klinkhamer | 340/172.5 |
| 3,665,487 | 5/1972 | Campbell et al. | 444/1 |
| 3,723,976 | 3/1973 | Alvarez et al. | 340/172.5 |
| 3,725,864 | 4/1973 | Clark et al. | 340/172.5 |
| 3,757,307 | 9/1973 | Cosserat et al. | 340/172.5 |
| 3,824,561 | 7/1974 | Wolf | 340/172.5 |

*Primary Examiner*—Mark E. Nusbaum
*Attorney, Agent, or Firm*—Nicholas Prasinos; Ronald T. Reiling

[57] ABSTRACT

A system and method for computer process control in a multiprogramming/multiprocessing environment is disclosed. Each process in the system is associated with a process control block (PCB) hardware structure which is identified by its logical address (J,P). The PCB acts as a virtual processor with null speed when, in fact, no real processor is assigned to the process. As utilized in a multiprogramming environment a virtual process (PCB) is substituted for the real processor (i.e. central processing unit, CPU) whenever the only job of the processor is to listen for a signal to be sent by another processor and to restitute the real processor to the process when, or after, the signal has arrived. The circumstances where a process starts using a processor solely as an "ear" are as follows:

a. when the process state switches from a running state to a waiting state; or b. when the process state switches from a running state to a suspended state.

In both instances the CPU is given away and replaced by the PCB.

10 Claims, 51 Drawing Figures

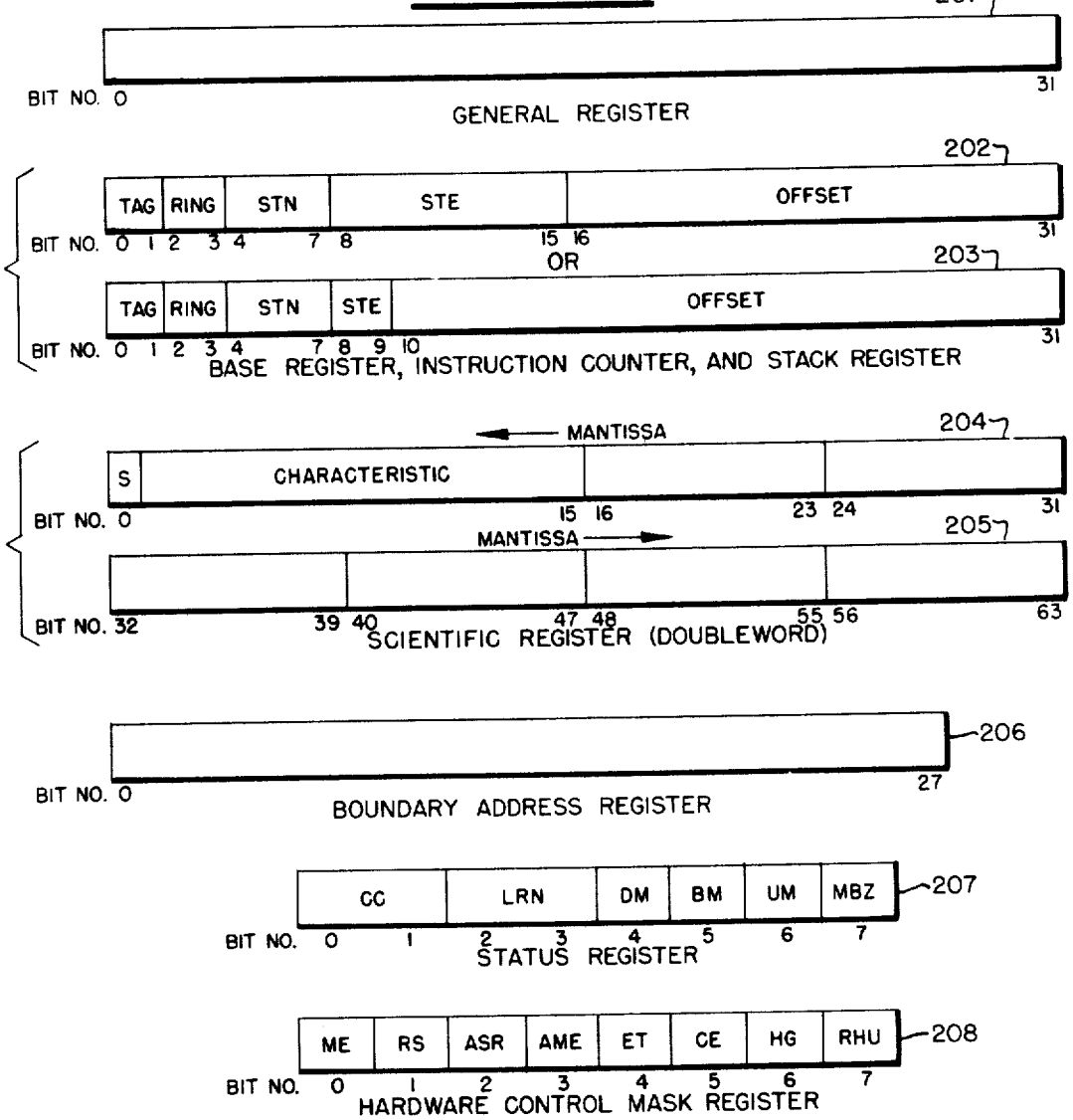

| Memory Location | Field | Name | |
|---|---|---|---|
| -40 | CURRENT STATE ENTRY TIME | CET | OPTIONAL |
| -32 | READY TIME ACCOUNTING | RTA | |
| -24 | WAITING TIME ACCOUNTING | WTA | |
| -16 | RUNNING TIME ACCOUNT | RUA | |
| -8 | RESIDUAL TIME OUT | RTO | |
| 0 (PCB ADDRESS) | CAPABILITY \| PRIORITY \| STATE \| DEXT | PMW #0 | |
| 4 | STATUS \| MBZ \| MP \| MBZ | PMW #1 | |
| 8 | | PMW #2 | |
| 12 | DETSZ \| DETA | PMW #3 | |
| 16 | STWSZ \| STWA | ASW #0 | |
| 20 | STWSZ \| STWA | ASW #1 | |
| 24 | | EXW | |
| 28 | T CONTENTS | SKW | |
| 32 | IC CONTENTS | ICW | |
| 36 | MBZ | | |
| 40 | | SBW #0 | |
| 44 | | SBW #1 | |
| 48 | | SBW #2 | |
| 52–80 | BASE REGISTERS SAVING AREA (8 WORDS) | | |
| 84–144 | GENERAL REGISTERS SAVING AREA (16 WORDS) | | |
| 148–176 | SCIENTIFIC REGISTERS SAVING AREA (8 WORDS) | | OPTIONAL |

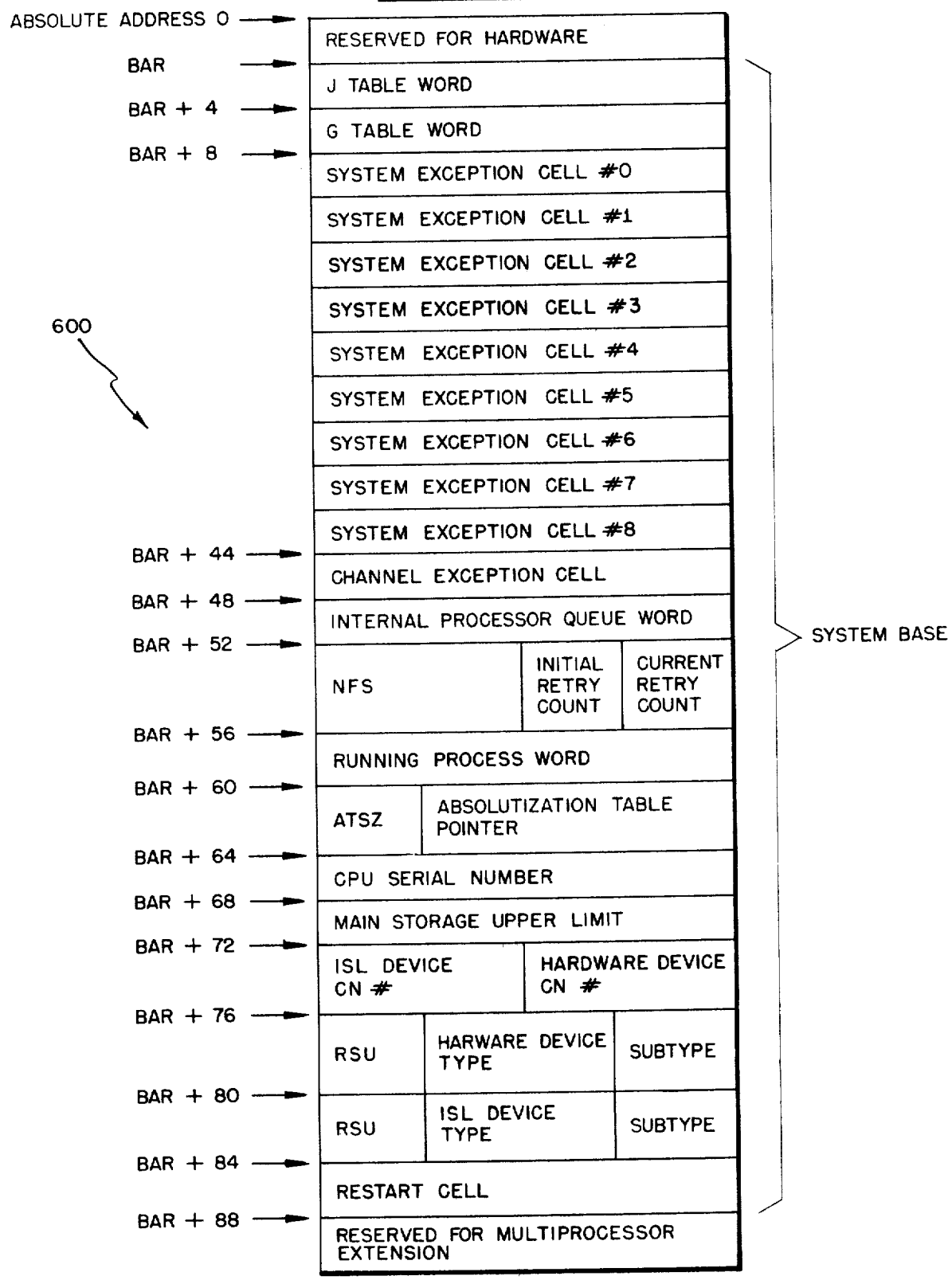

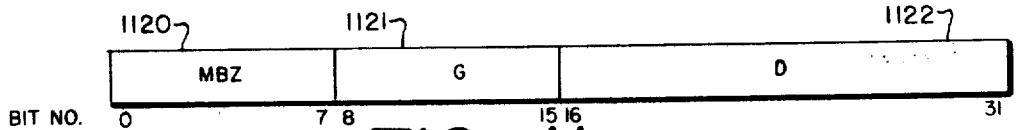
FIG. 11g
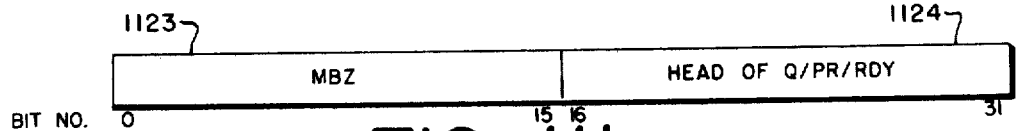
FIG. 11h
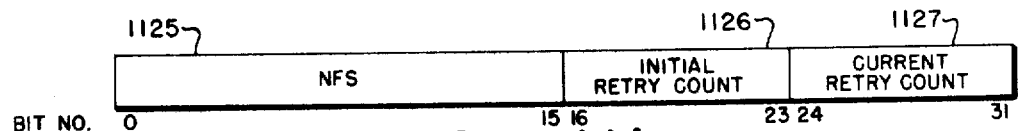
FIG. 11i
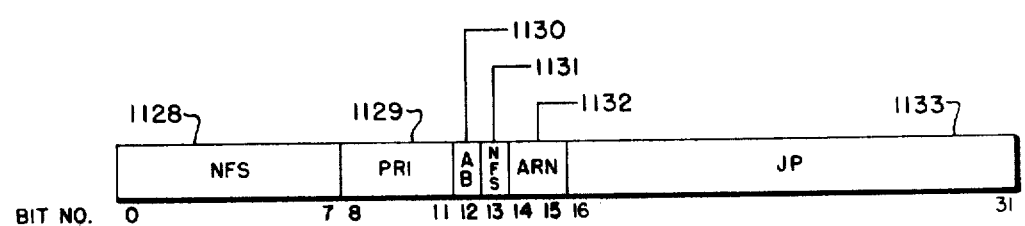
FIG. 11j
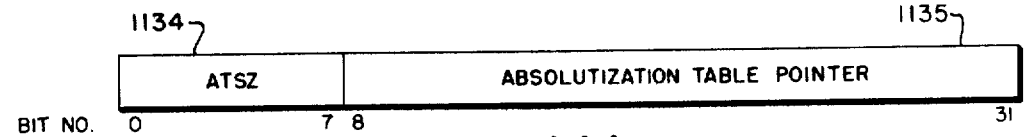
FIG. 11k
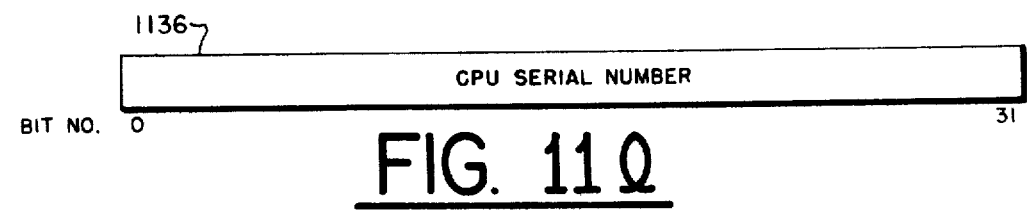
FIG. 11ℓ

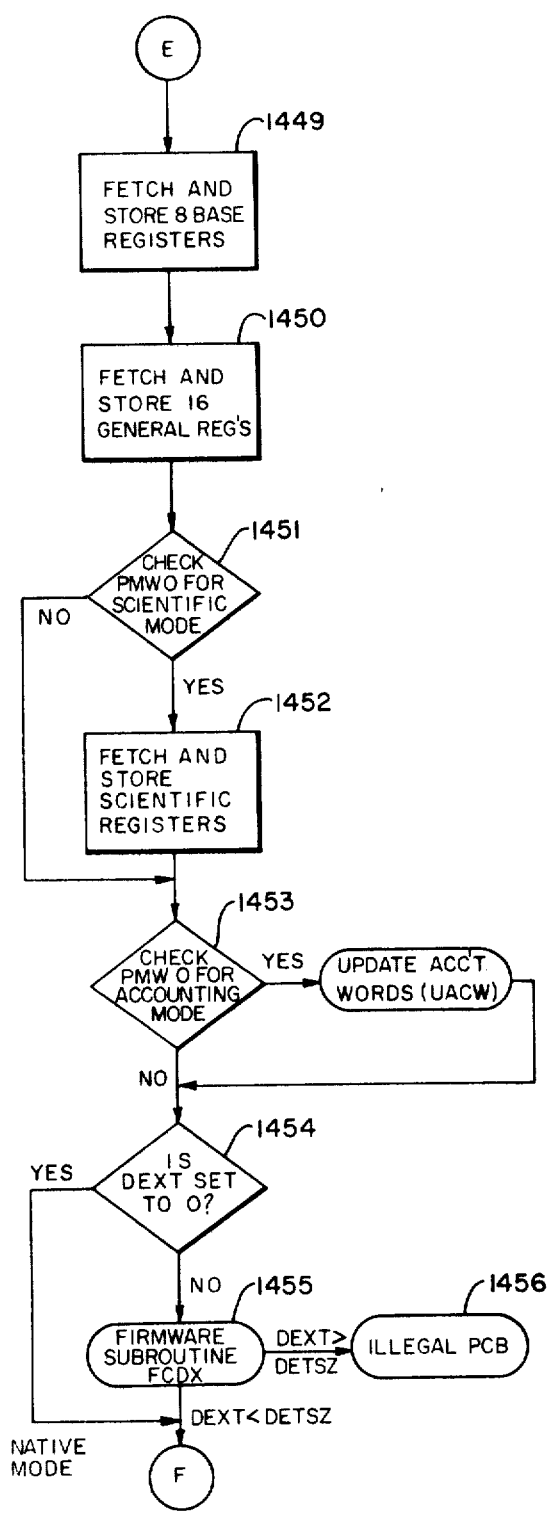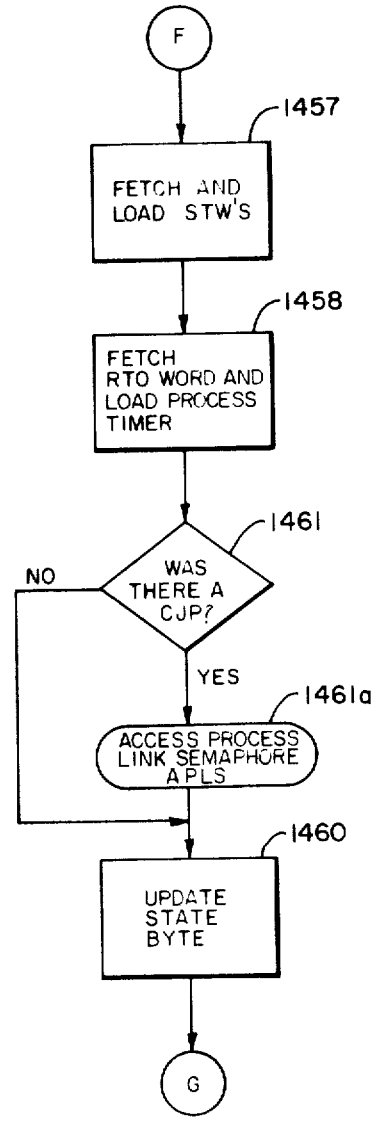
FIG. 14f
FIG. 14g

SYSTEM OF CONTROLLING PROCEDURE EXECUTION USING PROCESS CONTROL BLOCKS

RELATED APPLICATIONS

The following applications are incorporated by reference to the instant application.

1. "Buffer Store" invented by J. L. Curley, T. J. Donahue, W. A. Martland, and B. S. Franklin, filed on Oct. 5, 1972 having Ser. No. 295,301 and assigned to the same assignee named herein and now issued into U.S. Pat. No. 3,820,078 on 6/25/74.

2. "Variable Masking for Segmented Memory" invented by Wallace A. Martland and John L. Curley, filed on Oct. 5, 1972 having Ser. No. 295,303 and assigned to the same assignee named herein.

3. "Override Hardware for Main Store Sequencer" invented by Thomas J. Donahue, filed on Oct. 5, 1972 having Ser. No. 295,418 and assigned to the same assignee named herein.

4. "Main Memory Sequencer" invented by T. J. Donahue, J. L. Curley, B. S. Franklin, W. A. Martland, and L. V. Cornaro, filed on Oct. 5, 1972 having Ser. No. 295,331 and assigned to the same assignee named herein.

5. "Main Memory Reconfiguration" invented by J. L. Curley, B. S. Franklin, W. A. Martland, T. J. Donahue and L. V. Cornaro filed on Oct. 5, 1972 having Ser. No. 295,417 and assigned to the same assignee named herein and now issued into U.S. Pat. No. 3,796,796 on 3/12/74.

6. "Ring Checking Hardware" invented by Pravinsinh L. Parmar, et al filed on the Dec. 12, 1973, having Ser. No. 424,239 and matured into U.S. Pat. No. 3,916,385 on Oct. 28, 1975 and assigned to the same assignee named herein.

7. "Segmented Address Development" invented by Jacques Bienvenu, et al filed in the U.S. on 5/16/74 and having Ser. No. 470,496 and assigned to the same assignee named herein.

8. "Protection of Data in a Multiprogram Multiprocessor Computer System By Implementing a Concept of Rings to Represent the Different Levels of Privileges Among Processes" invented by, Marc Appell, et al, first filed on Nov. 30, 1973 in France and having Ser. No. 73 42706 and assigned to the same assignee named herein and further filed in the U.S. within the priority convention date of Dec. 2, 1974 and having U.S. Ser. No. 528,953.

10. "Procedure Calls and Stack Mechanism", invented by Marc Appell, et al, first filed on Nov. 30, 1973 in France, and having Ser. No. 73 42705 and assigned to the same assignee named herein and further filed in the U.S. within the priority convention date of Dec. 2, 1974 and having U.S. Ser. No. 529,019.

11. "Process Synchronization Utilizing Semaphores" invented by Jacques Bienvenu, et al, first filed on Nov. 30, 1973 in France, and having Ser. No. 73 42691 and assigned to the same assignee named herein and further filed in the U.S. within the priority convention date of Dec. 2, 1974 and having U.S. Ser. No. 529,256.

BACKGROUND

1. Field of the Invention

This invention relates generally to computer systems and more particularly to a system and method for controlling computer processes in a multiprogramming/multiprocessing environment.

2. Description of the Prior Art

Electronic computers have grown from first generation hardware characterized mainly by vacuum tubes, to second generation hardware characterized by transistors, to third generation hardware characterized, in the main, by integrated circuits. Along with these different generations of hardware there were different generations of software, wherein first generation software was characterized mainly by machine language, assemblers and subroutines, and second generation software was characterized by high-level languages, monitors, and macro assemblers. Third generation software is characterized by operating systems, on-line real-time systems multiprogramming systems, and data management systems.

The first generation hardware in combination with first generation software, and also the second generation hardware in combination with second generation software were primarily oriented toward batch processing where jobs were executed primarily in serial fashion. Moreover the third generation of hardware/software systems are also batch-process oriented; however because of the advent of multiprogramming, several jobs may be executed in parallel rather than serial, and permits the acceptance of input information for processing as it is generated.

The fourth generation system will be capable of satisfying the following requirements:

1. "The system will be classified as a communication and control system and will be capable of widely diversified processor applications. Intrasystem and intersystem communication interface will be required for both hardware and software.

2. "The system will be controlled primarily by data rather than by programs as were previous machines: i.e., system control will be established primarily by input rather than by stored instructions. Development of this characteristic is dependent upon submission of information in real-time. Feedback is a key consideration. Proper interactions between intersystem and intrasystem interfaces is vital. The interrelationships between data (communication bits) and programs (information bits) must be carefully defined.

"Multiple shift registers, large low-cost read-only memories, and batch-fabricated multifunction semiconductor devices make new computer organization feasible. Logic elements will perform a variety of tasks. For example, steering flip-flops will identify specific operations. These flip-flops will be set by serial or serial-parallel insertion of bits onto a subset of the leads to each logic package and an appropriate combination of clock and control signals. Data will be directed to a storage element with a more general (or rapid) access to other points in the system. Self-reconfiguration techniques and variable control memory structures will be possible because of steering flip-flops which identify inputs as control data, operating information, or data to be manipulated. Thus, main memory or scratch pad memory will temporarily assume the functions of control memory in the computer. Reconfiguration of a computer organization on a seemingly instantaneous basis will be possible. Parallel processing will be readily performed.

3. "Hardware will govern communication and control procedures; use of system control programs will be substantially reduced or eliminated. This characteristic is closely related to the preceding one. Focalizing system design by application of communication networks will eliminate much of the need for software and facilitate system control. Again, consideration of both intersystem and intrasystem data flow is important. When such techniques are applied, requirements for software control of the system will be minimized.

4. "Most processing will be executed in real-time; operations will be performed on input at a rate that provides output within the required response time. Real time, as discussed here, does not imply interleaving of programs or the man-machine interaction of time sharing. Rather, the implication is that the system will accept data as it is made available and process this data within the constraints imposed by desired response times.

5. "The system will be readily expandable. Hardware and software will be functionally modular in design. Computing power will be modified without redesign of the system. A variable instruction set is not implied. However, nested subsets of hardware will be available to complement nested subsets of software. In fact, this nesting of software is currently practiced. The user's software commonly includes both action macros and system macros. System macros commonly contain nested macros which perform communication functions for specified terminal devices. Such macros can be removed or specialized; system modularity results. Impetus is given to applying the family concept in the hardware (e.g. terminal) design." (Fouth Generation Computers: User Requirements and Transition "The Significance of the Next Generation: Technical Keynote Presentation" by Dr. C. J. Walter and Arline Bohl Walter. Edited by Fred Gruenberger, Prentice-Hall Inc. Englewood Cliffs, N.J. 1970 pps. 16–17 by permission of the publisher).

Processing in first generation hardware-software computer systems was relatively straightforward where the job or program was considered the basic processing unit. For each user initiated job or transaction a program generally ran with little or no interruption until the job or transaction was completed. Many straightforward jobs such as the compilation and execution of a high level language program, such as FORTRAN, could and did run as a single process. More difficult jobs, however, would require multitask operations and they would create other processes as they ran. (Note that a process is a concept implying the carrying on of some activity and should not be confused with the concept of a program, which is an activity description and can be used by one or more processes. We can speak either of a process or a processor executing a program. See Glossary of Definitions).

The concept of a process as being the basic processing unit developed to fill a need for the multiprogramming/multiprocessing environment of third generation computers. In such an environment where many users are demanding service simultaneously, it is natural to conceive of multiple processes competing for resources within the computer system. Each process consists of a program (i.e. an ordered collection of instructions and other data associated with the instructions) which is executed by the computer and operates on data to perform a user's job or some phase of that job. Where many such processes are demanding simultaneous attention from the system, the task of communicating with and between such processes and the task of controlling and allocating resources to such processes particularly in view of the requirements of fourth generation systems becomes extremely complex.

The Burroughs B-6500 and B-7500 computer, discussed in an article by E. A. Hauch and B. A. Dent entitled Burroughs B-6500/B-7500 Stack Mechanism, Proc. AFIPS Spring Joint Comp. Conf. 1968 pps. 245–251, Thomson, Washington, D.C. and also discussed in an article by J. G. Cleary entitled Process Handling on Burroughs B-6500 Proceedings of Fourth Australian Computer Conference, Adelaide, South Australia 1969, provides some measure of control of processes by utilizing a stack mechanism. Basically "each process is assigned memory for a stack in which are stored local variables, references to program procedures, data arrays and current process status . . . the stack operates as a last in first out storage area . . . an active process is represented by an active stack" (J. G. Cleary above pps. 231–232). Accordingly, a stack has the facility for storing the dynamic history of a program under execution.

Cleary further describes (pps. 233–234) how simple "Stack Trees-or Cactus Stacks of the Saguaro type" may be created to provide a vehicle for the control of multiprogramming and parallel processing.

However the stack mechanism techniques disclosed in the article are not totally satisfactory for fourth generation computer systems mainly in that they do not provide for adequate protection of information by restricting access to information to the myriad other processes of such fourth generation system, in accordance to some privilege accorded each process.

A paper entitled "Process Control and Communication" by A. J. Bernstein, G. D. Detlefsen and R. H. Kerr published in ACM Symposium of Operating Systems describes "the structure of processes and the interprocess communication facility implemented within a general purpose operating system.

This system allows a process to consist of up to four parts called its logical segments. These segments may be in physical disjoint locations when the process is in store. Relocation and protection of these segment is accomplished by four registers.

Generally the processes are controlled by an operating system which implements primitives (i.e. pseudo instructions) issued by the process and utilizing a mechanism by which the processes communicate with one another. Primarily communication comprises sharing events the same way they may share a file. Each process has KIT (Known Items Table) entries pointing to the same AIT (Active Items Table) entry which contains a unique entry for each currently open file. By means of this structure one process may request notification (by issuing a NOTIFY primitive) when the event occurs. As a result the operating system creates an entry on an event queue associated with the event which identifies the requesting process awaiting notification. At this point the requesting process may continue execution or it may suspend itself by issuing a BLOCK primitive. The event is said to occur when some other process issues a CAUSE primitive to it and can be catalogued and treated in the direction structure using the same primitives. Information may then be transferred from one process to the other or the processes otherwise cooperate to perform a given task. Other primitives in the operating system create and spawn processes or destroy them.

This technique of process communication and control does not provide an orderly dynamic history of the program under execution, but does introduce some concepts of software multiplexing of processes and event management. Nor does this technique provide for protection of one process from another by levels of privilege. Nor does it provide for an efficient manner of passing messages from one process to another. Moreover addressing processes and relocation appears inadequate for fourth generation systems. What is needed for fourth generation systems is a firmware/hardware system which efficiently addresses and relocates processes, and provides information structures identifying the state of the process and further supporting the process for controlling these states and for protection from other processes and from themselves by levels of privilege and which efficiently dispatches processes and synchronizes with other processes, and permits users who have written their programs in a modular way to pass from one program module to the other.

These and other requirements and their attendent problems in devising computer systems that effectively perform the required functions, with some suggestions for achieving some of these functions are discussed in a paper by Butler W. Lampson entitled "A Scheduling Philosophy for Multiprocessing Systems" published in ACM11 (5). However, the suggestions discussed in this article do not appear to sole the problems.

OBJECTS OF THE INVENTION

It is a primary object of the invention to provide an improved system and method for process control in a multiprogramming/multiprocessing environment.

It is another object of the invention to provide a system and method for process control which reduces operating overhead.

It is still another object of the invention to provide a system and method for process control wherein process status information and control information is centralized.

It is still a further object of the invention to provide hardware/firmware structures for multiplexing processes.

Yet another object of the invention is to provide a virtual processor having a null speed.

These and other objects of the invention will become apparent from the description of a preferred embodiment of the invention when read in conjunction with the drawings contained herewith.

SUMMARY OF THE INVENTION

Processes in a multiprogramming environment have four possible states: running, ready, wait and suspended.

A process is in the running state when it has control of the CPU. The ready state is equivalent to running except that the process does not have control of the CPU. A process is in the wait state if it cannot continue until a specific event occurs. A suspended process is a process which has been stopped for a time and may be resumed later.

Each process in the computer system is associated with a hardware structure called the process control block (PCB) which acts as a virtual processor with null speed and contains control information required by the logical processor i.e. the collection of hardware resources and control information necessary for the execution of a process. The virtual processor (PCB) is substituted for the real central processor unit (CPU) whenever the only job of the processor is to listen for a signal to be sent by the process when, or after, the signal has arrived. The circumstances where a process starts using a processor solely as a listening device are as follows:

a. when the process state switches from a running state to a waiting state; or b. when the process state switches from a running state to a suspended state.

In both instances the CPU is given away and replaced by the PCB.

A PCB's absolute address is defined by 2 integers, J and P, sometimes called the logical name of the process. At an absolute location, known by the firmware, there is a table, called the J table. Entry #j of the J-table contains the absolute address, Pj, of a table called the P-table. Entry #p of the P-table contains the absolute location of the PCB defined by the logical name (J,P).

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

FIG. 2 is a schematic representation of various hardware structures utilized by the invention.

FIG. 3 is a legend of terms used for reserved areas of storage in registers depicted in FIG. 2.

FIG. 4 is a schematic diagram of a process control block.

FIG. 6 is a schematic diagram of the system base of the invention.

FIGS. 14a through 14i are flow diagrams of the dispatcher unit in firmware.

DESCRIPTION OF A PREFERRED EMBODIMENT

GENERAL DISCUSSION

Figure 1:
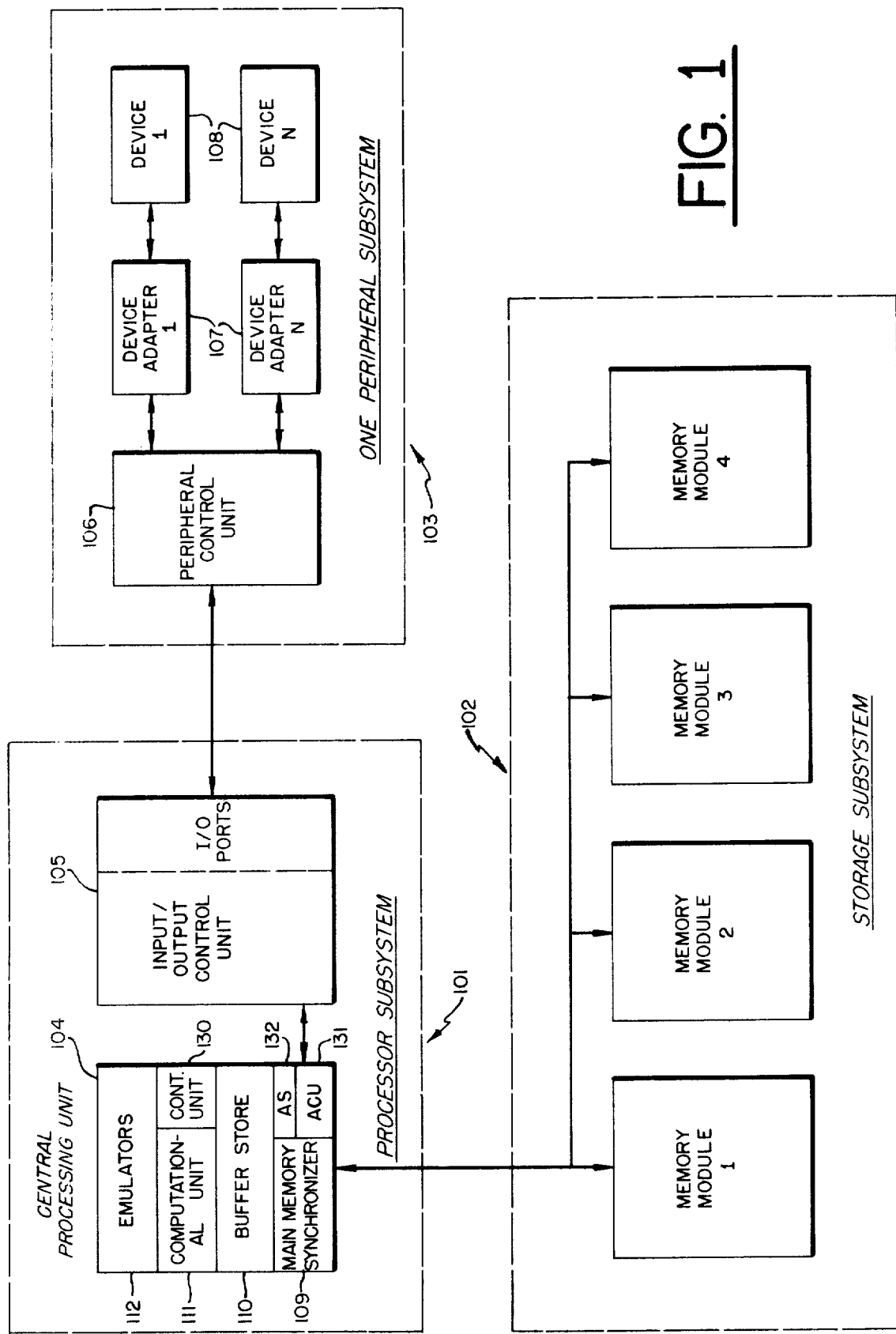
FIG. 1 is a block diagram of a multiprogramming system utilizing the invention.

The invention operates typically in the hardware system environment, hereinafter described, coordinated by a hardware/firmware/software operating system. Referring to FIG. 1 the subsystems are the processor subsystem 101, the storage subsystem 102, and one or more —up to 32— peripheral subsystems 103. The processor subsystem contains a central processing unit (CPU) 104 and up to four input/output control units (IOC) 105. Each peripheral subsystem consists of a peripheral control unit (PCU) 106, a number of device adapters (DA) 107, and up to 256 peripheral i/o devices 108. The storage subsystem 102 consists of one to four semiconductor memory modules of 32 to 512 kilobytes each.

I. PROCESSOR SUBSYSTEM

In the processor subsystem 101, the CPU 104 performs the basic processing operations for the system, and interfaces with memory 102. The IOC 105 controls all information exchanges between the storage subsystem 102 and peripheral devices 106.

A. CENTRAL PROCESSING UNIT

The CPU includes a main memory synchronizer 109, a buffer store 110, various elements that comprise the computational unit 111, and optional emulation facilities 112. The main memory synchronizer 109 resolves conflicts for the use of main memory among the computational unit 111, the buffer store 110, and the IOC 109. Conflicts are resolved on a priority basis: the IOC has the highest priority followed by memory writes (from the computational unit) and then memory reads (into the buffer store). The main CPU also includes the address control unit ACU 131 which controls main memory addressing and the associative memory AS 132 used to store most recently used addresses of main memory. The buffer store 110 is a small high-speed buffer memory that reproduces a selected region of main memory and interfaces with the computational unit to decrease average memory access time. During each memory read, both the buffer store and main memory are accessed. If the information to be fetched is already in the buffer store, the main memory read is terminated and the information fetched from the buffer store. Otherwise the main memory 102 is read. Every time this is done, the CPU 104 fetches 32 bytes that contains the desired information. This information remains in the buffer store for future memory references. Since the buffer store is transparent to software, the program controlling the computer at any given moment cannot determine whether the information it is processing has been fetched from the buffer store or from main memory.

The computational unit 111 performs all data processing and address generation within the CPU. A typical control store 130 within the computational unit (see a book entitled Microprogramming: Principles and Practices, Samir S. Husson, Prentice Hall, Inc.) contains firmware which initializes the system, controls the CPU 104 and IOC 105, and decodes an instruction set (not shown). Optionally the control store may provide scientific instructions, test routines, emulation packages, or special purpose features which extend the capabilities of the processor subsystem.

As an option, the CPU provides emulation of systems other than the instant system. Emulators 112 are components of firmware, software, and in some instances hardware.

B. INPUT-OUTPUT CONTROL UNIT

The IOC 105 portion of the processor subsystem provides a data path between any peripheral subsystem 103 and the storage subsystem 102. This path allows for the initiation of peripheral commands and controls the resulting data transfers. An IOC can typically handle up to 32 channel control units (not shown).

C. PERIPHERAL SUBSYSTEMS

In a peripheral subsystem 103 on FIG. 1 the PCU 106 is a stand-alone microprogramming processor that relieves the load on the CPU 104 by controlling the i/o devices 108 during i/o operations. The PCU does this by executing instructions contained in a channel program. This program results in arithmetic, logical, transfer, shift, and branch operations being performed in the PCU. There are several kinds of PCU's according to the kind of device each controls: i.e. unit record, mass (disk) storage, magnetic tape, communications, etc.

Device adapters 107 mediate between every PCU and the devices it controls. Each contains the dedicated firmware and logic necessary to implement communication with a particular type of device. Depending on the type, a DA 107 controls one or several devices.

The major functions performed by a peripheral subsystem 103 are as follows:
1. Transforming CPU instructions into a series of commands acceptable to the appropriate peripheral device.
2. Packing and unpacking data in the form needed by the CPU or the appropriate peripheral device.
3. Keeping the CPU informed of the status of the subsystem and of the devices under its control.
4. Independently initiating and processing error and recovery procedures.
5. Allowing on-line diagnosis of a device without disturbing the device-sharing capabilities of the associated peripheral processor. p A PCU resolves conflicts for main memory between the devices attached to it; however, the IOC resolves conflicts between PCU's.

D. STORAGE SUBSYSTEM

Each memory module 1-4 is 4 or 8 bytes wide. The number of modules, their size, and the data path width may vary according to size of computer. Memory modules are four-way interleaved in such a way that the four modules are accessed sequentially (module 1 contains the first 8 bytes, module 2 contains the second 8 bytes, etc.). Interleaving decreases the number of conflicts for access to main memory and thereby decreases the average memory access time. Memory is reconfigurable in case of failure; i.e., blocks of memory within a module may be removed without destroying contiguous addressing.

Main memory 102 consists of a capacitive storage medium in the form of metal oxide semiconductor (MOS) chips. This medium operates on the refresh principle to maintain information. Each memory location is typically refreshed at least once every 2 milliseconds; the design ensures that few conflicts occur between refresh timing and memory accesses. (In cases of conflict, refreshing takes precedence).

An area at the beginning of main memory is reserved for hardware and firmware. The upper limit of this area is defined by the content of a boundary address register (BAR - to be later described) which is visible to the system software. The BAR content is set at system initialization time. The memory area below the address specified in the BAR can contain IOC tables which define the configuration of the peripheral subsystems, firmware to control the CPU, or microprograms and tables for emulation. The size of the area below the address specified in the BAR depends on the system configuration. Whether microprograms are in main memory or control store depends on the system configuration and the applications run on the system.

II. BASIC MACHINE STRUCTURES

There are typically three basic data structures utilized in this hardware: data formats, software visible registers, and the instruction formats.

A. DATA FORMATS

Information is transferred between memory and the CPU in multiples of 8 parallel bits. Each 8-bit unit of information is called a byte. Parity or error correction is also transferred with data but cannot be affected by software. Therefore, in this patent specification the term data excludes the associated parity or error correction data.

B. BYTES

Bits within a byte are numbered 0 through 7 from left to right. Bytes are processed separately or in groups. Two bytes constitue a halfword, 4 bytes a word, 8 bytes a doubleword, and 16 bytes a quadword. These are the basic formats for all data, including instructions.

C. DATA REPRESENTATION

All data are in binary form, but may be interpreted as binary, decimal, or alphanumeric. Data bits are interpreted in groups of four, as binary coded decimal data; eight as alphanumeric, or 16 to 64 as binary digits. The latter are interpreted as signed, fixed, or floating-point numbers in binary notation. Any number of contiguous bits up to a doubleword may also be manipulated as a string. The alphanumeric character set is represented in EBCDIC. ASCII is supported as an alternate exchange code.

D. BYTE ADDRESSES

Byte locations in main memory are consecutively numbered starting with zero; each number is the address of the byte. A group of consecutive bytes is said to be halfword-, word-, doubleword-, or quadword-aligned, if the address of the left byte in a group is a multiple of 2, 4, 8, or 16, respectively. Whenever a halfword, word, doubleword, or quadword is so aligned, that unit can be fetched from that address. The location of data in main memory is specified by a data descriptor which is accessed indirectly during address development. (See U.S. Pat. Application Ser. No. 470,496 filed on May 16, 1974 entitled Segmented Address Development and assigned to the same assignee as the instant application).

E. VISIBLE REGISTERS

There are 33 user-visible registers in the CPU 104 FIG. 1 whose contents collectively define the state of the CPU. There are four types: (See FIG. 2).
1. general registers
2. base registers
3. scientific registers (optional)
4. miscellaneous registers

F. GENERAL REGISTERS

General registers (GR) 201 are used to manipulate fixed-point binary numbers and bit strings. There are typically sixteen 32-bit general registers in the CPU 104 — GR0 through GR15. General register GR8 through GR15 are also usable as index registers. When used as index registers, they are herein called X0 through X7: Indexing is performed using the 32-bit two's complement integer contained in a register.

G. BASE REGISTERS

Base registers (BR) have the same format as instruction counters IC and stack registers 202–203. Base registers are used during address computation to define a part of memory. There are typically eight 32-bit base registers, BR0 through BR7.

H. SCIENTIFIC REGISTERS

Scientific registers (SR) are optional equipment for computation with floating-point binary numbers. There are typically four 8-byte scientific registers which are referred to as SR0 through SR3. Scientific registers have the format 204–205 of FIG. 2.

I. MISCELLANEOUS REGISTERS

There are five other registers:
instruction counter -having format 202–203;
status register -having format 207;
stack register (called the T register);
boundary address register -having format 202–203; and
hardware control mask register -having format 208.

The instruction counter (IC) is a 32-bit register that contains the address of the instruction being executed. The status register (STR) 207 is an 8-bit register that records facts about the procedure currently being executed, for example, whether an underflow was caused by the most recent operation. The stack register also known as the T-register is a 32-bit register that contains a pointer to the top of a pushdown stack associated with the currently active procedure. Stacks to be described infra provide a work space, and a mechanism for saving local variables and preserving procedure entry and return information. The boundary address register (BAR) 206 is a 28-bit register which specifies the lowest absolute main memory address accessible by software. This register is loaded during system initialization and can only be read by software. The hardware control mask register 208 is an 8-bit register which records machine condition information.

J. INSTRUCTION FORMATS

There are approximately 200 instructions although more or less may be utilized. Each instruction is one of four different lengths but always an even number of bytes long. Instructions are stored in consecutive storage locations. The address of the leftmost byte is a multiple of 2, and is the address of the instruction.

The eight most significant bits (and in some cases bits 8 through 11 or 12 through 15) of an instruction represent the operation code, while the remaining bits represent one or more operands. An operand may be a register designator, displacement desginator, address syllable (logical address), literal value, immediate literal value. The type and number of operands are determined by the instruction format.

III. SYSTEM ORGANIZATION

A. JOB STEP AND TASK

Work to be performed by the computer system is defined externally by a series of job steps via a job control language. A job step is a unit of work to which hardware resources are allocated. Typically a job step consists of several tasks. A task is the smallest unit of user defined work consisting of a stream of instructions executed without parallelism.

B. PROCESS

The user-visible concepts of task and job step are represented in the hardware by a process and process group, respectively. A process is defined as an ordered sequence of instructions which can be executed asynchronously by the CPU (i.e., several processes can be active and sharing resources, but only one process is actually running at any one instant). A process group is a related set of processes necessary to perform one job step.

C. PROCESS CONTROL BLOCK AND SYSTEM BASE

Because processes can relinquish CPU control at various points during their execution, a storage area in main memory is made available to a process to save CPU status. This status information is utilized to precondition the CPU before a process regains control of the CPU.

The storage area assigned to a process is called a process control block (PCB) 400 on FIG. 4. The data contained in a PCB include the addresses of memory areas (address space) assigned to the process, the contents of all pertinent registers, and the state of the process. Thus a PCB serves as a temporary storage area for information necessary to start or restart a process without any information loss. Each PCB is visible to the hardware and can be addressed by the operating system via a set of hardware tables developed during system initialization and modified during system operation (FIG. 5).

Figure 5:
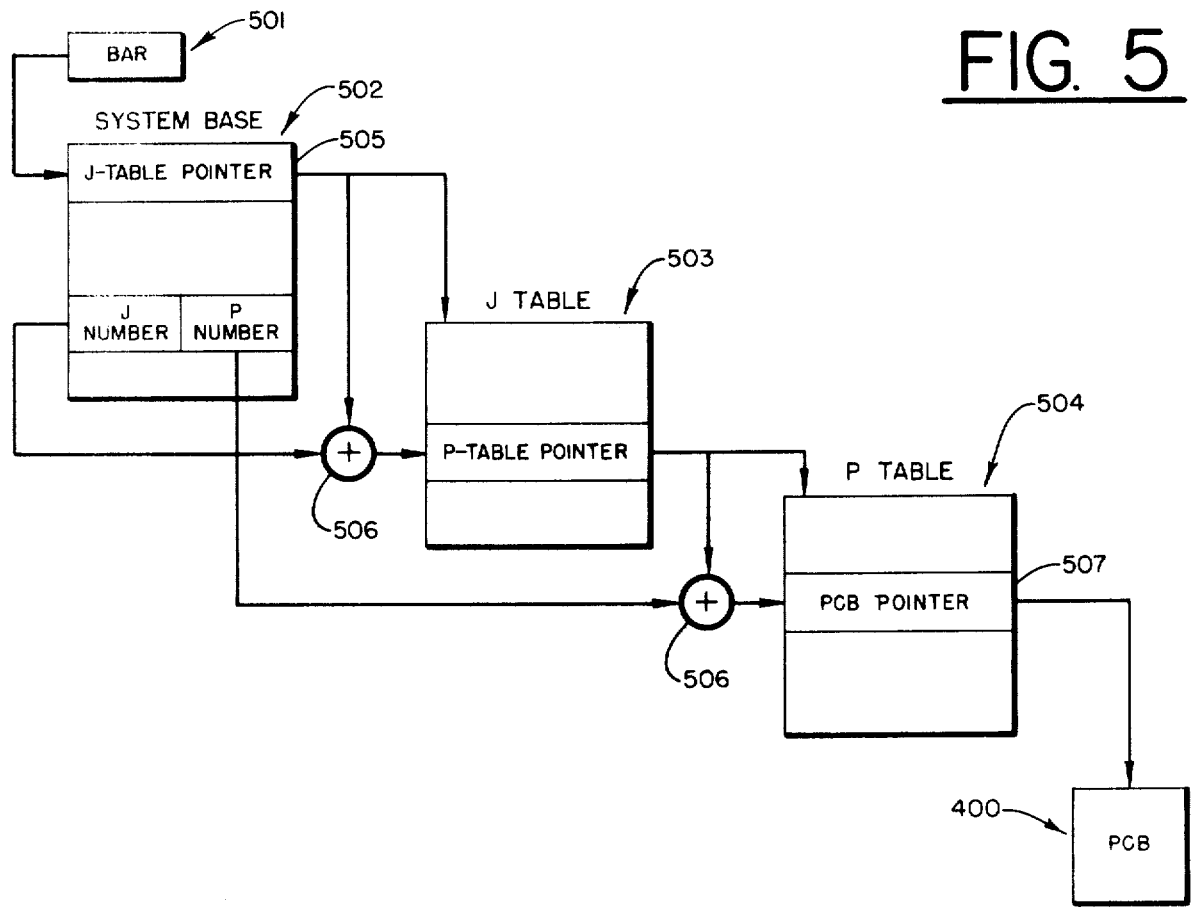
FIG. 5 is a schematic diagram of a system for addressing a process control block.

There is an absolute main memory area which is referred to as the system base (FIGS. 5 and 6). This area is developed by firmware and is accessible via the base address register (BAR) 501 which can be read but not written. The system base 502 contains a number of system attributes which include a job step number and a process group number (J, P) respectively for the currently running process. Another attribute in the system base is a pointer to a hardware defined data structure known as the J table 503. This table contains an entry for every job step presently in the system. Each entry in the J table 503 points to an associated P table 504 which is also a hardware defined data structure. This table defines a process group and contains an entry for every process in the process group. Each P-table entry points to a PCB 400.

Referring to FIG. 5 the J-table pointer 505 indexed by the J number via the arithmetic portion 506 of computational unit 111 (FIG. 1) provides access to a J-table entry 503. This entry contains a P-table pointer which when indexed by the P number via computational unit 506 provides access to a P-table entry 504. The P-table entry contains a pointer 507 to the PCB of the current running process. Thus the operating system can access the active PCB using the contents of the BAR 501 and can access any other PCB given its associated (J, P) logic name.

D. MEMORY SEGMENTATION

In a multiprocess environment, such as herein described there are many processes in memory at any given time. These processes vary in size and demand for memory which causes a memory allocation problem. The hardware herein described in cooperation with an operating system (not shown herein) solves the problem by dynamically allocating memory space. Due to the random nature of memory requirements, memory is allocated in variable size segments and the memory allocation can be restructured during process run time. Thus, a process may be allocated a number of noncontiguous memory segments. This memory allocation method is called segmentation.

Segmentation presents an additional problem in that memory addresses have to be modified whenever part or all of a process is relocated. To alleviate this problem the system herein described provides a technique whereby addresses used by a process are logical rather than absolute main memory addresses. These logical addresses are used to develop absolute addresses.

Segmentation also allows each process to access its own or related memory segments via a system of segment descriptors. By accessing a segment descriptor, a process can obtain the address of a segment. Segment descriptors are contained in main memory and are maintained by the operating system.

Each process may have access up to 2068 memory segments. Normally, this would require an equal number of segment descriptors per process. However, since segments can be shared, the operating system groups segment descriptors into segment tables. This grouping is based on accessability by one process (task), a process group (job step), or globally (system wide). Each process may have up to 15 segment tables associated with it. This technique requires only one segment descriptor for each segment which can be accessed by a process via a segment table. Thus, the memory space required for segment descriptors is decreased; memory updating during relocation is reduced; and some program protection is provided. (The main mechanism for program protection is the ring system. See U.S. Patent Application Ser. No. 528,953 filed on Dec. 2, 1974 entitled "Protection of Data in a Multiprogram, Multiprocessor Computer System By Implementing a Concept of Rings to Represent the Different Levels of Privilege Among Processes" invented by Marc Appell, et al and first filed in France and having French Ser. No. 73 42706 and assigned to the same assignee as the instant application.

A process must be able to determine which segments it is allowed to access. Accordingly, the system provides a process with two segment table word arrays (STWA). These arrays contain the addresses of all segment tables accessible to a process. There are two segment table word arrays per process because there are two segment sizes, large and small. Large segments have a maximum size of $2^{22}$ bytes while small segments have a maximum size of $2^{16}$ bytes. All segments vary in size in 16-byte increments up to the maximum. A system can typically accomodate up to 28 large segments and 2040 small segments.

Segment table word arrays may be relocated by the operating system; therefore, a process must know the absolute address of its associated STWA's. The PCB for any process contains two words which contain this information which are known as address space words ASW0-1 on FIG. 4. Each word points to a segment table word array STWA. The operating system updates the contents of the ASW's whenever the associated STWA's are relocated. Working down the chain or pointers and decoding the segment descriptor is a firmware function and thus once initiated is not visible even to the operating system.

Segmentation defines over 200 million bytes of address space as being available for processes. This number exceeds the capacity of main memory; therefore, a secondary storage (magnetic disk or drum) is used in conjunction with main memory. The operating system creates the illusion that the system has a much larger main memory than is really available. This concept is called virtual memory.

At any given time, a defined segment may or may not be physically in main memory. The contents of a segment descriptor indicates whether or not the associated segment is in main memory. The hardware detects any attempts by a process to access a segment not in main memory and notifies the operating system. The operating system causes the desired segment to be loaded into main memory from secondary storage. Then the operating system places the segment's memory address in the segment descriptor which is the only place where the absolute address of a segment can be found. This operation is invisible to the process and thus it is not aware that the segment was not in main memory or that it may have to be relocated in main memory. (For details on memory segmentation see U.S. Patent Application Ser. No. 470,496 filed on May 16, 1974 and entitled "Segmented Address Development."

The computer system herein described provides data and procedure protection by preventing processes from interferring with each other or sharing each other's address space in an unauthorized manner. This protection is accomplished by restricting addressability via memory segmentation and by a ring system.

The segment tables isolate the address space of the various processes in the system. Processes always use a segmented address during execution. A segmented address consists of a segment number and a relative address within the segment (see above referenced application on Segmented Address Development). The hardware checks that the address used by a process is part of the address space assigned to the process. If the address is outside the prescribed address space, an exception occurs. A process cannot refer to data within the address space of another process because the hardware uses the segment tables of the referencing process. Thus, there is no possibility for a process or process group to reference an entity belonging to another process group.

Generally, overlap in address space in the system occurs for those segments shared by all processes. These public segments are created by system programs which check to insure against address conflicts. Thus, segmentation protects user programs against each other and protects the operating system against user programs.

Segments shared by several processes are not protected from misuse by one of these processes. To solve this problem, a ring system is utilized whereby procedure and data segments are grouped into a four-class hierarchy. The four ring classes are numbered 0 through 3. Each ring represents a level of system privilege with level 0 (the innermost ring) having the most privilege and level 3 (the outermost ring) the least. Every procedure in the system has a minimum and a maximum execute ring number assigned to it which specifies who may call the procedure. A procedure is a subroutine which is capable of calling other procedures and passing parameters to them:

The general rules of the ring system are as follows:

1. A procedure in an inner ring has free access to data in an outer ring. Conversely a procedure in an outer ring cannot access data in an inner ring.
2. A procedure in an outer ring can branch to a procedure in an inner ring, but the reverse is not allowed.
3. Each segment containing data is assigned two ring values, one for read (RD) and one for write (WR). These ring values specify the maximum ring value in which a procedure may execute when accessing the data in either the read or write mode.

Each time a procedure instruction is executed, the procedure's ring number (effective address ring, EAR) is checked against the ring numbers assigned to the segment containing the referenced data. The EAR is the maximum number of process ring numbers in the instruction counter and all ring numbers in base registers the data descriptors found in the addressing path. Access to the data will be granted or denied based on a comparison of the ring numbers. For example, if a system table exists in a segment having a maximum read ring value of 3 and a maximum write ring of 1, then a user procedure executing in ring 3 may read the table but may not update the table.

By predesign, rings 0 and 1 are reserved for the operating system and rings 2 and 3 are reserved for the user. Ring 0 contains those segments critical to total system operation. Ring 1 contains the bulk of the system segments whose failure would not be catastrophic and would allow recovery. The user may utilize ring 2 for checked-out programs and ring 3 for programs being debugged.

F. PROCEDURE CALLS

Figure 7A:
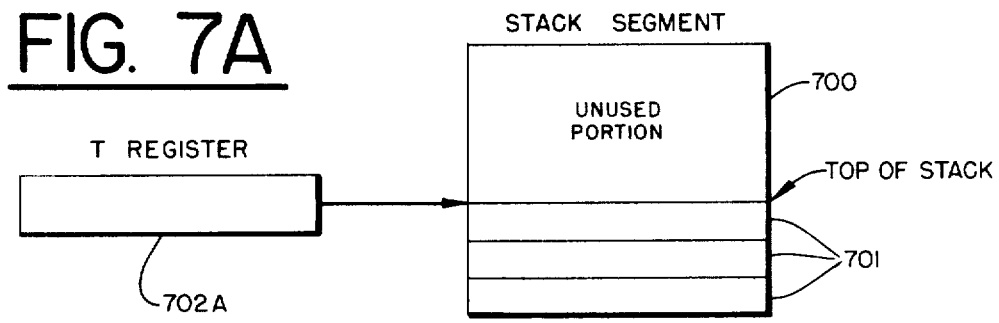
FIGS. 7A and 7B are a schematic representation of a stack segment and a stack frame respectively.

The procedure call is an important function in the system herein described. Procedure calls are used to pass from one procedure to another; to allow user procedures to employ operating system services; and to achieve a modular structure within the operating system. A procedure call is effected by instructions and a hardware recognized entity called a stack (FIG. 7A).

A stack is a mechanism that accepts, stores and allows retrieval of data on a last-in-first-out basis. Stacks reside in special segments called stack segments. A stack segment consists of a number of contiguous parts called stack frames 701 (FIGS. 7A and 7B) which are dynamically allocated to each procedure. The first stack frame is loaded into the top of the segment and succeeding frames are loaded after it. The last frame loaded is considered the top of the stack. The T-register 702A locates the top of the stack for the currently active process. A virtual T-register exists in the PCB of all other processes in the system.

Figure 7B:
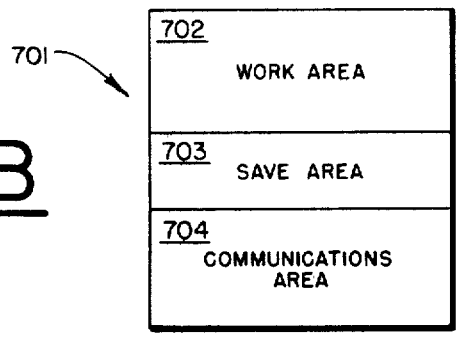

A stack frame 701 of FIG. 7B consists of three areas: a work area 702 in which to store variables, a save area 703 in which to save the contents of registers, and a communications area 704 in which to pass parameters between procedures. Prior to a procedure call, the user must specify those registers he wishes saved and he must load into the communications area the parameters to be passed to the called procedure. When the call is made, the hardware saves the contents of the instruction counter IC and specified base registers to facilitate a return from the called procedure.

Each procedure call creates a stack frame within a stack segment 701 and subsequent nested calls create additional frames. Each exit from one of these called procedures causes a stack frame to be deleted from the stack. Thus, a history of calls is maintained which facilitates orderly returns.

To insure protection between procedures executing in different rings, different stack segments are used. There is one stack segment corresponding to each protection ring per process. A PCB contains three stack base words which point to the start of the stack segments for rings 0, 1 and 2 associated with the process. The ring 3 stack segment can never be entered by an inward call; therefore, its stack starting address is not required in the PCB.

IV. PROCESS MANAGEMENT AND SYNCHRONIZATION

The system herein provides for multiprocessing operations which are controlled by an operating system using a combination of software, hardware and firmware. Software creates and deletes processes within the system while hardware and firmware multiplex processes on the CPU. In addition, a combination of software, hardware and firmware provide for synchronization between processes.

Processes are normally, but not always, started and stopped at the initiation and termination of i/o operations, during related job handling, and at other times for purposes deemed necessary by the operating system. Therefore, a communications system is necessary to efficiently start and stop related processes and to pass information between them. The hardware system herein provides internal messages called semaphores to provide a communications link between the processes.

A. PROCESS STATES

A process can be in one of four possible states at any time: running, ready, waiting or suspended. The hardware recognizes these four possible process states and executes various firmware procedures to effect process dispatching, state changes and to maintain data structures based on a process's state. The PCB contains a state field which defines the current state of its associated process.

A process is in the running state when it has control of the CPU. This state involves supplying the CPU with an address space (segment tables) and a starting address. The CPU then executes instructions in the procedure segments of the process. The process name J table word (logical address) of the PCB for the currently running process is retained in the running process word (BAR +60) within the system base (FIG. 6). (Note: The system base shown in FIG. 5 is the same as that shown in FIG. 6, but with some details omitted.)

The ready state is equivalent to running state except that the process does not have control of the CPU because it has not been recognized by the CPU. A process in the ready state is in contention for the CPU with other ready processes and the running process.

A process is in the wait state when it cannot continue until a specific event occurs such as a message via a semaphore. A waiting process is not in contention for the CPU but it may be in contention with other waiting processes for the required event.

A suspended process is a process which has been stopped for a time by software and may be resumed later. The decision to stop and resume the process is external to the process. Thus, a suspended process is not active and therefore cannot receive notification of event occurrences and cannot utilize the CPU.

A process is suspended under the following conditions:

(1) By executing a Terminate instruction (as a result of having completed all its functions.)

(2) By execution of a Suspend instruction by the operating system.

(3) By the occurrence of an exception condition whereby control is transferred to the operating system.

B. PROCESS DISPATCHING

Processes move from one state to another voluntarily by action of the process while running or involuntarily by the actions of other processes. CPU firmware, known as the dispatcher, controls the transaction of processes between states. The dispatcher uses a set of queues (to be later described) to manipulate processes which are in the ready or the waiting states. Suspended processes are controlled by software.

Figure 8:
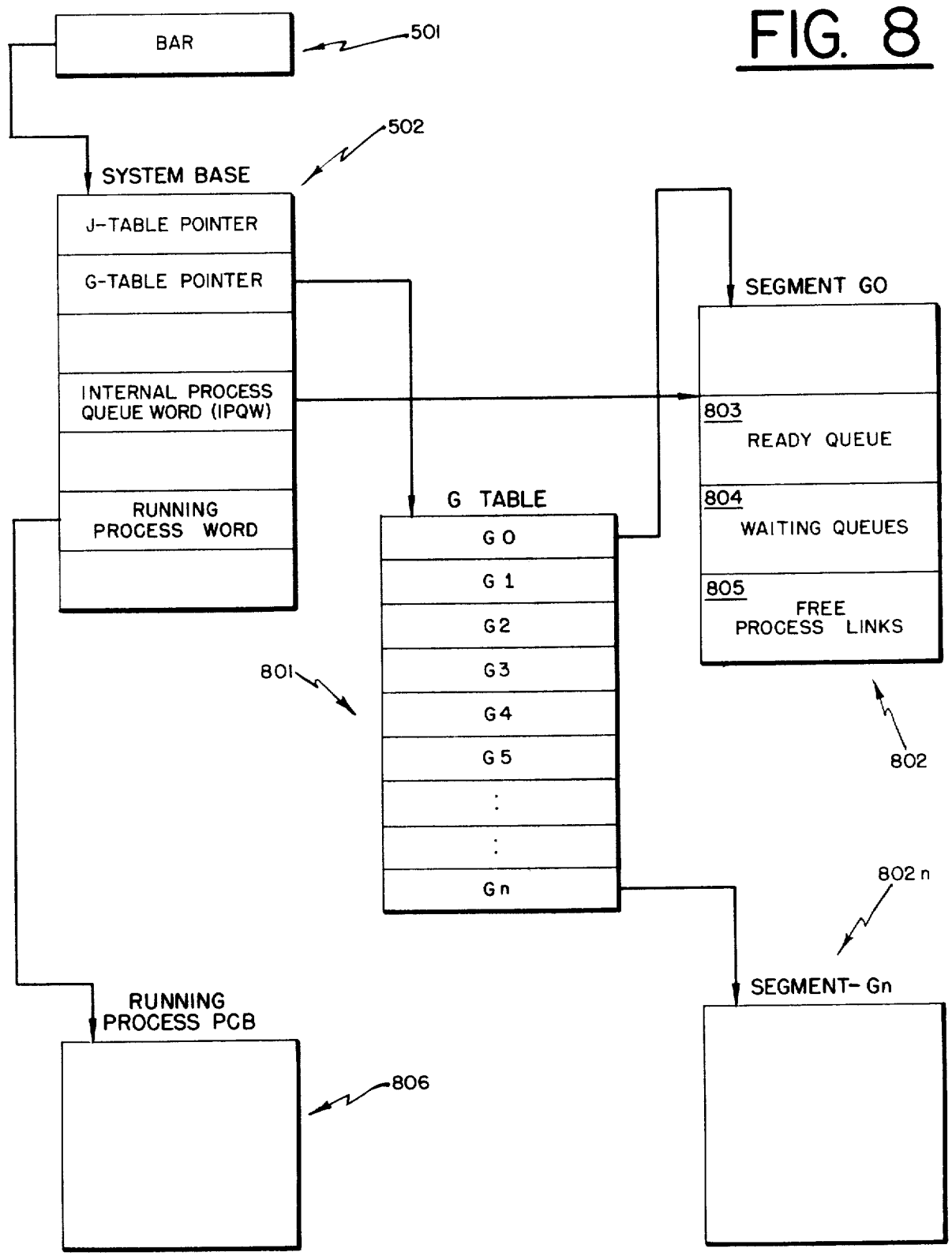
FIG. 8 is a schematic diagram of a system for addressing G-segments and in particular the queue of processes in the G0 segment.
Figure 9:
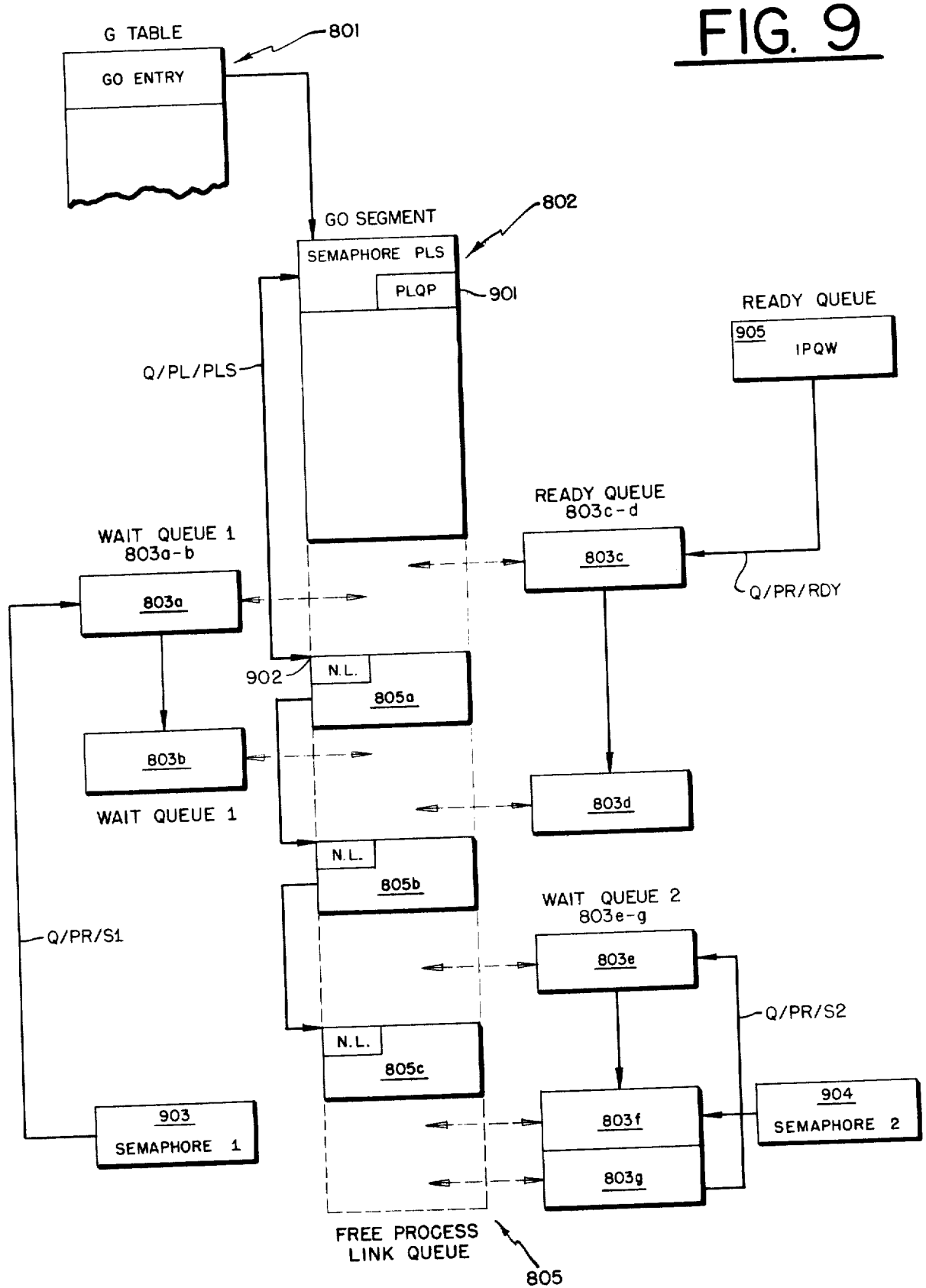
FIG. 9 is an exploded schematic diagram of a G0 segment illustrating queue of processes and process linking.

Referring to FIGS. 6, 8 and 9, a ready or waiting process is represented by a PCB and a special queue entry called a process link. FIG. 9 shows an exploded view of contents of the G0 segment 802, and contains process links 803a-803b and 803c-803g of active processes, and free process links 805a-805c of suspended processes. Each process link specifies the process name (J, P), the process priority and a pointer to the next process link in the queue. There are various types of queues such as wait queue 803a-b and ready queue 803c-g.

A hardware device similar to the J table, known as the G table, (FIGS. 6 and 8) contains pointers to all general (known system wide) segments 802-802n. The first element, G0, of the G table 801 points to that segment 802 containing the dispatcher queues. A G-table pointer to the G table 801 is found in the system base 502 on FIG. 5. Also in the system base is an entry called the internal process queue word (IPQW) which identifies the head 805 of the ready queue 803c-803g in the G0 segment 802.

Thus, the dispatcher can examine all ready processes processes by consulting the ready queue 803c-803g. When the currently running process changes states, the dispatcher removes the process link at the head of the ready queue and uses the J, P name to access its PCB. The process defined by the PCB then becomes the new running process.

Since more than one process may be awaiting on the same event, a queue of waiting processes 803a-803b exists for each event. Waiting processes are also strung together via process links 805 residing in the G0 segment. A pointer to the head of a wait queue exists in a semaphore 903 (to be later described). A number of events exist for which a process may wait; therefore, there are a number of wait queues each of which has an associated semaphore 903, 904.

The number of processes ready or waiting varies dynamically. Thus, the number of process links required for the ready and wait queues also varies. This fact introduces a memory management problem for the dispatcher. The problem is solved by another queue called the free process link queue 805a-c. This queue links together all process links in segment G0 that are not being used by the ready or the wait queues and can be used to extend a particular queue of ready or waiting processes. A pointer 901 to the head 902 of the free process link queue 805 resides near the beginning of the G0 segment 802.

C. PROCESS SYNCHRONIZATION

Process synchronization is required to coordinate the activities of two processes working on the same task. The synchronization is achieved using semaphores 903-904 which are data structures residing in the address space of communicating processes. A semaphore is used to signal event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from a semaphore. (The sending operation is often called a V-operation; the receiving operation is called a P-operation). The sending operation allows a process to send data or a signal that data are ready. The semaphore stores the signal until another process is ready to pick it up. Thus, the sending process is free to proceed, since it has sent the data. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus, a semaphore can hold a signal until a process picks it up, or a semaphore can hold a process until a signal is sent to it.

Messages can also be passed from process to process. A message has the same present or not present quality as a signal plus additional information. Part of the information is supplied by hardware and part is supplied by the procedure of the process that sent the message. A message carries the process name of the sending process. Thus, many processes can send information through a single semaphore stamped with the sender's name.

A message semaphore may have a queue of messages waiting to be picked up by the processes. As with signal semaphores, requirements for memory space increases and decreases thus presenting a memory management problem. Again, the problem is solved with a queue of free message links. These links reside in a known place in a segment that can easily be found when needed to supply or absorb message links.

Because semaphores and the queues built on them are shared by different processes, the total semaphore structure is protected. This is accomplished by hardware and software conventions that restrict access to any segment containing semaphores. Thus, semaphores must be in semaphore descriptor segments, some of which may be G segments (if system communications is necessary). However, all G segments (except G0) are semaphore descriptor segments.

Each semaphore descriptor contains a pointer to a semaphore. Semaphore addresses are developed via a semaphore descriptor, thus providing added protection for the semaphore. A semaphore segment can be addressed logically using a segment number and a relative location within the segment or directly using the G, D number.

PROCESS CONTROL BLOCK STRUCTURES

Figure 10A:
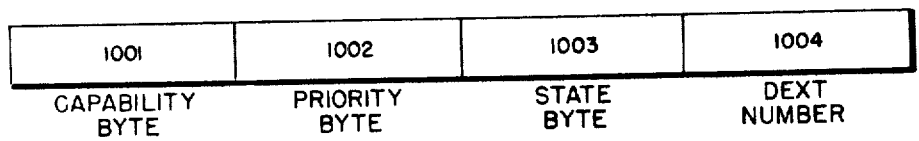
FIGS. 10a through 10l are block diagrams of structures in the PCB.
Figure 10B:
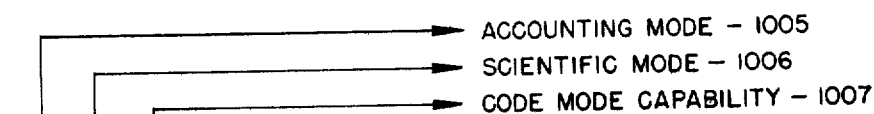

Referring to FIG. 4 there is shown the format of the process control block (PCB). The process control block 400 is a storage area in main memory made available to a process to save the CPU status. Addressing a PCB is performed as described supra in relation with FIG. 5. The PCB pointer 507 (FIG. 5) points to the process control block PCB at memory location 0 on FIG. 4. It will be noted that proceeding in a downward direction memory locations increase by 4 bytes whereas in proceeding in an upward direction from memory location 0 they increase by 8 bytes. The downward memory locations are considered positive from 0 whereas the locations in an upward direction from 0 are considered negative directions. The upward locations are optional and may or may not be included in the process control block; also locations 148 through 176 are also optional. (Note that the numerals under memory location specify the displacement in bytes from the 0 reference location of the process control block PCB and are not to be confused with the reference numerals commonly used to identify parts in a patent drawing). Starting at byte 0 up to but not including byte 16 there are stored four process main words PMW 0 through PMW 3 with each process main word PMW being four bytes in length. Process main word 0 occupies bytes 0 through 3 and is comprised of 4 parts: a capability byte, a priority byte, a state byte and a decor extension byte DEXT. Referring to FIGS. 10a through 10d there are shown details of process main word PMW 0, with further details of the capability byte 1001 shown on FIG. 10b. Referring to FIG. 10b, the first bit 1005 is the accounting mode bit for indicating whether or not time accounting functions are being performed for the process. When the accounting mode bit 1005 is set to binary 0 no time accounting function is being performed for the process; whereas when the accounting mode 1005 is set to binary 1, time accounting is being performed. The scientific mode bit 1006, when set to zero, indicates that saving of scientific register of the machine is not performed and the scientific register saving area located at bytes 148 to 176 on FIG. 4 does not exist in the process control block PCB. When the scientific mode bit 1006, is set to binary 1, the scientific optional feature exists and is being used in the process, and the scientific registers saving area is used to save the contents of the scientific registers when necessary. The code mode bit 1007 indicates whether or not a standard code set or compatibility code set is being used by the process, with a binary 0 in that position indicating that standard code set is being used; whereas a binary 1 in the third bit position 1007 indicates a compatibility code set is being used. The remaining of the bits of the capability byte are set to zero.

Figure 10C:
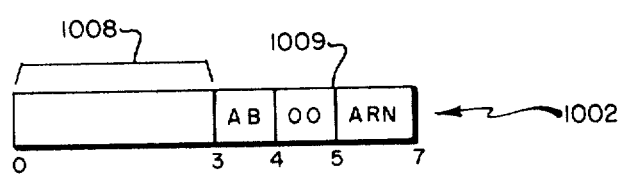

Details of the priority byte 1002 are shown on FIG. 10c. Referring to FIG. 10c the first four bytes 1008 of priority byte 1002 is utilized to set the priority level of the process associated with that given process control block PCB. Each process is assigned one of 16 levels of priority which is used for ordering competing processes i.e. (a) for choosing the process to be run among ready processes, (b) for putting processes in queues. Priorities decrease from 0 to 15, and for a given priority level the FIFO (first in first out) rule is applied. The next 4 bits 1009 of priority byte 1002 are zeroes as follows: an asynchronous trap bit AB located at bit positions 3-4; an asynchronous trap ring number ARN located at bit positions 6–7. These bit locations are used to invoke the asynchronous trap mechanism.

Figure 10D:
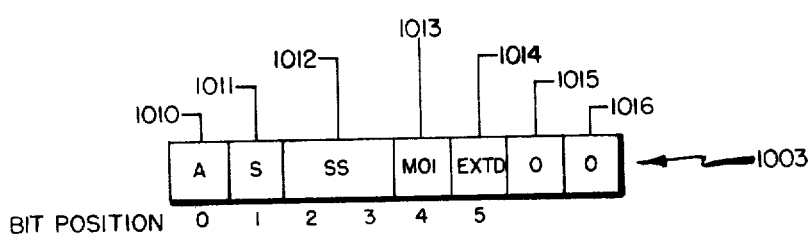

Referring now to FIG. 10d details of the state byte 1003 are shown. A state byte is utilized to provide information with regard to the process associated with the process control block PCB 400. The active field bit A 1010 is set to binary 1 when the process is activated. The suspend field S 1011 is set to binary 1 when the process is suspended. The substate field SS 1012 is a 2 bit field and defines the following substates of the process: (a) when set to binary 00 the process is inactive; (b) when set to binary 01 the process is waiting in queue of ready process (Q/PR/RDY); (c) when set to binary 10 the process is waiting on a semaphore in a queue of semaphores (Q/PR/S); (d) when set to binary 11 the process is being executed by the processor. The mid-operation field (MOI) 1013 is set to binary 1 when an interrupt happens and is taken care of during the execution of an instruction — i.e. before the completion of the process. The extended decor mode bit EXTD 1014 is set to 1 when the process is operated in an extended decor mode which is an emulation mode of the machine. Bits 1015 and 1016 are set to 0. The fourth byte of process main word PMW 0 contains the decor extension number and is utilized when the system is in emulation mode.

Figure 10E:
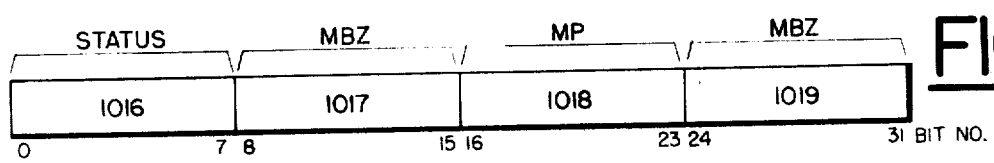

Process main word PMW 1 is stored in bytes 4–7 of the process control block PCB. Details of PMW 1 is shown on FIG. 10e. The status byte 1016 is the first byte in PMW 1 and stores the status register contents. The multiprocessor byte MP 1018 is significant in a multiprocessor architecture otherwise this field is zero. The second and fourth bytes of process main word 1 are the MBZ fields 1017 and 1019 respectively which must be zero for normal operation.

Figure 10F:
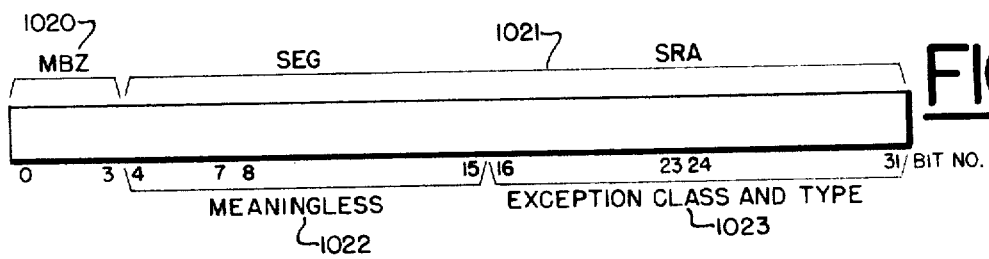

Process main word PMW 2 occupies bytes 8 through 11 of the process control block and is shown in more detail on FIG. 10f. Referring to FIG. 10f the field from bit 4 through bit 31 contains the local name SEG, SRA 1021 of the semaphore to which the PCB is linked when the process is either in the waiting or suspended states. The exception class and type field 1023 contains the class and the type of the interrupt-like exception which cause the process to enter the suspended state after an exception. The field from bits 4 through 15 is meaningless 1022 when a process is in a different state than those mentioned above.

Figure 10G:
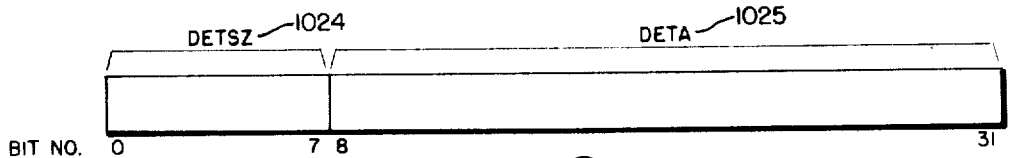

Process main word PMW 3 occupies bytes 12 through 15 in PCB 400 and points to a decor extension table. Referring to FIG. 10g for details of PMW 3 the DETSZ field 1024 defines the number of entries in the table and if this field is zero no decor extension is allowed to the process. The DETA field 1025 is the absolute address of the decor extension table in units of 16 bytes and is significant only if DETSZ is not 0. The decor extension table is made up of DETSZ entries. Each entry is one byte size. The DEXT[th] entry of the table defines the capability of the process to operate in the order extension mode DEXT. When the DEXT[th] byte is 0 the decor extension number DEXT is not allowed, whereas if the DEXT[th] byte is 1 the decor extension number DEXT is allowed. Values of DEXT other than 0 and 1 are illegal. (See FIGS. 10a DEXT number 1004).

Figure 10H:
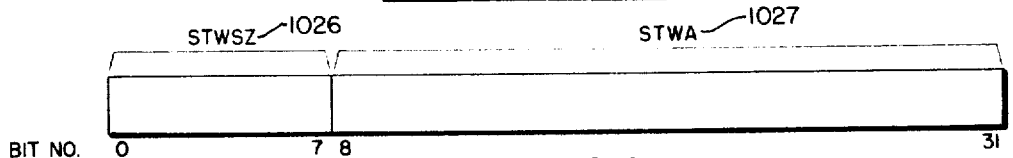

Bytes 16 through 23 of PCB 400 contains 2 address space words ASW 0 and ASW 1 respectively and each ASW contains a pointer to an array of segment table words. Both ASW 0 and ASW 1 respectively have the same format shown on FIG. 10h. The size of the array of the segment table words is defined by the number of segment table words in an array and typically comprises six for ASW 0 and eight for ASW 1. The STWSZ field 1026 indicates the size of the array of the segment table words. The segment table word array field STWA 1027 contains the absolute address STWA of the array in units of 16 bytes — i.e. the absolute address of the array is 16 times STWA in bytes.

Figure 10I:
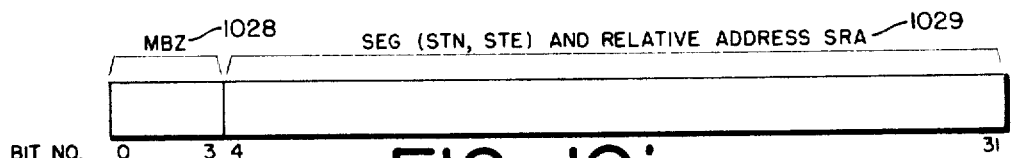

Bytes 24 through 27 in the PCB contain an exception word EXW shown in greater detail on FIG. 10i. The exception word contains a pointer (SEG, SRA) 1029 to an exception class table which defines the action to be taken following a process exception according to its class as stored in process main word PMW 2. (See FIG. 10f). The MBZ field 1028 of exception word EXW must be 0.

Figure 10J:
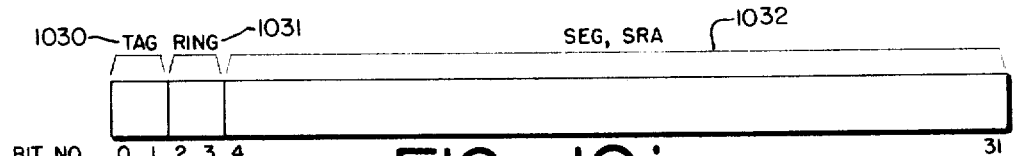

The stack word SKW located in bytes 28 through 31 of the PCB contains the value of the top of the T register of the stack of the process when the process is not running and is shown in greater detail in FIG. 10j. Referring to FIG. 10j, bits 0 and 1 define the TAG field 1030. The TAG indicates the type of descriptor by its contents and must be zero for SKW. Bits 2 and 3 of the SKW word contain the RING field 1031 which contains the ring number associated with the segmented address of the stack for protection purposes and in this case must be zero. Bits 4 through 31 contain the segment number SEG, and the segment relative address SRA 1032 and is a field which identifies the segment described in a segment table and the segment relative address within the segment. The stack word SKW is updated every time the process leaves the running state. It is used to restore the T register contents every time the process becomes running. In this last case the TAG 1030 and RING 1031 are tested to be zero, otherwise an illegal PCB exception occurs.

Figure 10K:
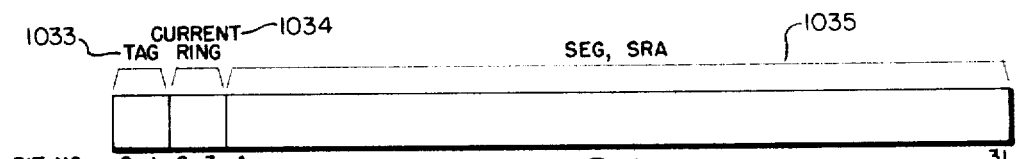
Figure 10L:
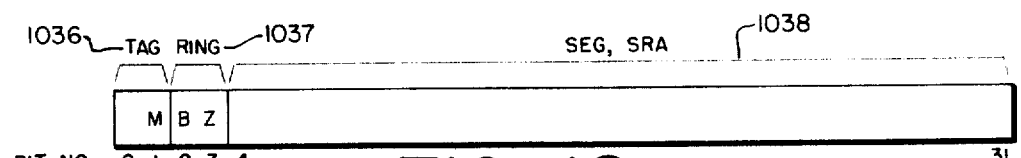

Bytes 32 through 35 of the PCB 400 contain the instruction counter content word ICW sometimes also referred to as ICC. Referring to FIG. 10k there are shown details of the instruction counter word ICW wherein the TAG field 1033 must contain binary 00 (i.e. values other than zero are illegal in the instruction counter). The current RING field 1034 occupying bits 2 and 3 defines the current ring number of the process to be used in determination of access rights to main storage. Bits 4 through 31 define the segment number and the segment relative address (SEG, SRA) 1035 which define the address of the next instruction to be executed.

The MBZ field in bytes 36 through 39 must be zero. (Note the MBZ field always indicates a field which must be zero). The MBZ word is tested every time the PCB is accessed from the name J, P. If it is not zero an illegal PCB exception occurs.

Stack base words SBW 0–2 occupy bytes 40–51 in the process control block 400. These words have the same format which is shown in greater detail on FIG. 10 1. They are utilized during stack operations and whenever used their TAG field 1036 and RING field 1037 must be zero otherwise an illegal PCB exception occurs. Bits 4 through 31 contain the segmented address (SEG, SRA) 1038 of the first bytes of the stack segments for ring zero, 1 and 2 respectively.

Bytes 52 through 83 of the process control block 400 is a space reserved for the base registers saving area (8 words). Bytes 84 through 147 is a saving area which is utilized to save the values of all general registers (16 words). Bytes 148 through 179 is a saving area which is utilized to save the scientific registers (8 words).

Five double words are provided in the PCB 400 above the PCB zero address, for time accounting purposes when the accounting mode bit in the PMW 0 word is set. These words are located from PCB address minus 8 to PCB address minus 40. Each word contains a time or a time interval expressed in microsecond units in its first 52 bits with bits 52–63 filled with zeroes. The residual time out double word RTO (first 8 bytes above 0 in the PCB) contains the quantum of time which is actually spent by the processor on behalf of the process before a time out exception occurs. The RTO word is updated in the following way: each time the process exits the running state the process timer value is stored in the RTO word. Each time the process enters the running state, the process timer value is loaded from the RTO.

The running time accounting RUA double word at bytes 7 through 15 is a time counter which specifies the total amount of processor time a process was in the running state. The time accounted for is the time actually spent by the processor on behalf of the process exclusively. The RUA word is updated in the following way: each time the process exits the running state, the value of the process timer PT is read. The difference of the contents of RTO and PT is added to RUA. (Consecutively, the PT value is stored in RTO). Note that the time during which the process is suspended is not computed. The RTO and RUA words are updated even if the accounting mode bit is set to 0. However the CET, RTA, and WTA words (to be later described) are provided in the process control block only if the accounting mode bit in the process main word PMW 0 is set to 1. They are updated only in this case.

The waiting time accounting WTA word at bytes 17 through 23 is a real time counter which specifies the total amount of real time the process was in the waiting state. The WTA word is updated in the following way: each time the process exits the waiting state the time of day clock (not shown) value TOD is read and the value of TOD minus the value of CET word is added to the WTA word.

The ready time accounting RTA word located at bytes 24 through 31 is a double word which is a real time counter which specifies the total amount of real time the process was in the ready state. The RTA is updated in the following way: each time the process exits the ready state, the time of day clock value TOD is read, and the contents of TOD minus the contents of CET is added to RTA.

The current entry time CET double word at bytes 32 through 39 contains the time of day at which the process entered one of the following states: ready, waiting, running, and suspended.

SYSTEM BASE STRUCTURES

Figure 11A:
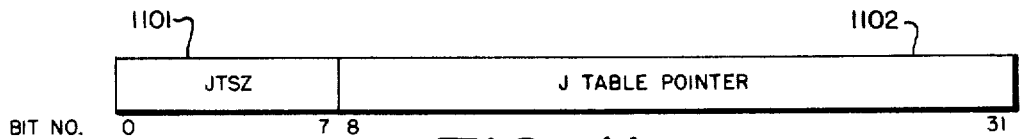
FIGS. 11a through 11r are block diagrams of structures in the system base.
Figure 11B:
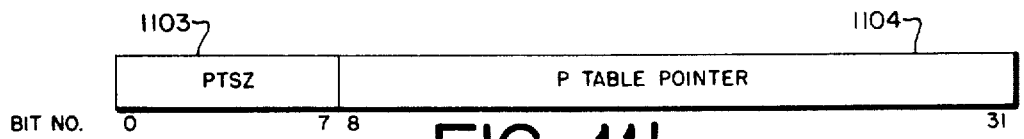
Figure 11C:
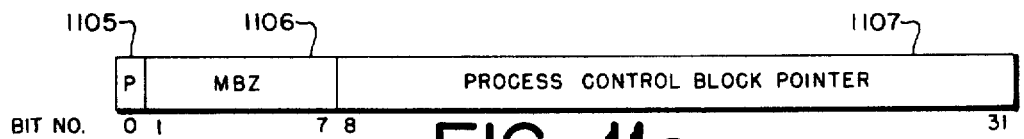

Referring to FIG. 6 the format of the system base 600 is shown. The system base resides in absolute main memory and is developed by firmware and is accessible via the boundary address register (BAR) which can be read but not written. The boundary address register BAR is below an area in main memory reserved for hardware and separates this area in memory reserved for hardware and the system base 600. Referring now to FIG. 6 the system base 600 contains a number of system attributes which includes a job step number and a process group number (J, P) for the currently running process. From the logical name of the process J, P, the absolute address of the corresponding process control block PCB is obtained. The size and address of the J table are defined by the contents of the J table word (JTW). This word is located at the address defined by the BAR register. The format of the JTW is shown on FIG. 11a. The size (JTSZ) 1101 or the J table 1204 on FIG. 12 defines the number of entries in the J table 1204 which may be up to 255 entries. The JTSZ 1101 is an 8 bit positive integer; an out of J table exception occurs if J is greater than JTSZ. The absolute address of the J table 1204 is obtained by multiplying the J table pointer 1102 by 16. The J table 1204 contains J table entries whose format is shown in greater detail on FIG. 11b. Each J table entry defines the absolute address of a P table 1205 which is obtained by multiplying the P table pointer 1104 by 16. The size (PTSZ) 1103 of a P table defines the number of entries in the P table. The PTSZ is an 8 bit positive integer which may typically vary from 0 to 255 to indicate the number of entries in the P table. An out of P table exception occurs if P is greater than PTSZ. Each entry of the P table 1205 defines the absolute address of a process control block (PCB) 1206 by multiplying the process control block pointer 1107 by 16. A presence indicator P 1105 indicates the absence of a PCB 1206 when set to binary 0 and indicates the presence of a PCB when set to binary 1. (When the presence indicator P 1105 is found to be 0 a vacant P table entry exception occurs). Bits 1 through 7 of the P table indicator (FIG. 11c) must be 0 (MBZ) 1106, otherwise an illegal P table entry exception occurs.

Figure 11D:
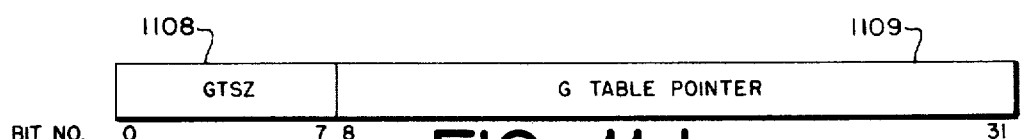
Figure 11E:
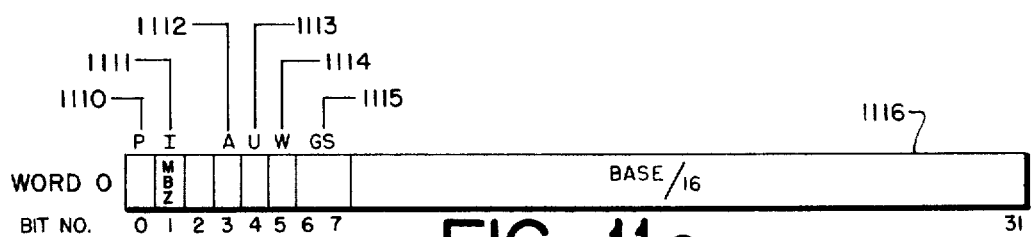
Figure 11F:
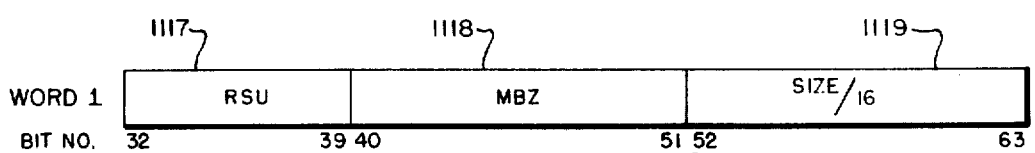

At address BAR plus 4 of the system base 600 there is the format byte of a G table word (GTW) shown in greater detail on FIG. 11d. The size and the address of a G segment-table 1212 on FIG. 1200 are defined by the contents of the G table word (GTW). The size (GTSZ) 1108 of the G table 1212 defines the number of entries in the G table which may typically be up to 255 entries. GTSZ is an 8 bit positive integer; an out of G table exception occurs if the G number is greater than the GTSZ. The absolute address of the G table 1212 is obtained by multiplying the G table pointer 1109 by 16. The format of the G segment table entry has a two word size (8 bytes) and is called a G segment descriptor. The format of the G segment descriptor is shown in detail on FIGS. 11e and 11f. All G segment descriptors are direct and therefore the indirect bit I, 1111 must be 0 otherwise an illegal segment descriptor exception occurs. The presence indicator P 1110 is a one bit field which when set to binary 1 indicates that a segment is defined in main storage for the segment number to which that descriptor corresponds; whereas if it cleared to 0 no segment is defined and a reference to the segment descriptor causes a missing segment exception. The available bit A 1112 is a one bit field which indicates whether or not the segment is available; it is only checked if this segment is defined (i.e. P equals binary 1), otherwise it is ignored. The used flag field U 1113 indicates whether or not the segment has been accessed. If the U bit is set to binary 0 the segment has not been accessed; whereas if the U field is set to binary 1 the segment has been accessed. The written flag field W 1114 indicates whether the segment has been written. If W is set to binary 0 the segment has not been written; whereas if W is set to binary 1 the segment has been written. The gating indicator GS 1115 of a G segment descriptor must be set to binary 01, otherwise an illegal segment descriptor exception occurs. The reason for this is that a G segment always contains semaphores (although the reverse is not true i.e. all semaphores are not required to be in a G segment) and instructions on semaphores require the GS code to be binary 01. The absolute address of the base of a segment 1214 is defined in the G segment descriptor of FIG. 11e by the 24 bit base field 1116; the content of this field is multiplied by 16 to obtain the absolute address. The second word of the G segment descriptor of FIG. 11f occupies bit position 32 through 63 in the G table 1212. The RSU field 1117, bits 32 through 39 is reserved for software use and is generally ignored when used as a G segment descriptor as it is in this case. The MBZ field 1118 must be 0 otherwise an illegal segment exception occurs. Since the MBZ field 1118 occupies bits 40 through 51 it sets the SIZN field 1119 which is the field for a small segment SIZN; hence all G segments must be of the small segment type. The segment SIZE 1119 is a 12 bit positive integer defining the number of bytes in the segment and the segment size is interpreted as a multiple of 16. Therefore the segment size for a G segment 1214 cannot exceed 216 bytes (small segments).

Referring once again to the system base 600 of FIG. 6 there are 9 system exception cell words located between BAR plus 8 and BAR plus 44. The format of the system exception cell words EXC is shown on FIG. 11g. Since semaphores are utilized for transmitting messages to dedicated processes when a system exception occurs the pointers to these semaphores are found in 9 locations of memory each location called a system exception cell — one per class of system exception. The MBZ field 1120 must be set to binary 0 otherwise a system check occurs. Each exception cell (EXC) contains the system name G, D 1121 and 1122 respectively.

The channel exception cell located in BAR plus 44 of the system base 600 has a format which is similar to the system exception cell previously discussed and contains the system name GD of a semaphore which is used for transmitting messages to dedicated processes when a channel exception occurs.

An internal processor queue word IPQW is located beginning at BAR plus 48 and details of its format are shown on FIG. 11h. The IPQW word points to the head of a queue of processes ready (Q/PR/RDY) as shown on FIG. 9 by reference numerals 905 and 805. The queue of processes ready (Q/PR/RDY) links all processes which are in the ready state. It is referenced by the HEAD of Q/PR/RDY-field 1124 (FIG. 11h) of the IPQW word by pointing to the top of the ready process queue. The HEAD of Q/PR/RDY-field 1124 contains a 16 bit positive integer which is the displacement from the base of the G segment number 0, referred to as the GO segment, to the first byte of Q/PR/RDY. If this Q/PR/RDY bit field is 0, the ready queue is considered to be empty. The MBZ field 1123 must be 0 otherwise a system check occurs.

At BAR plus 52 of the system base 600 there is shown the storage for the initial and current retry counts whose format is shown in detail on FIG. 11i. The NFS field 1125 is a nonfunctional storage field and is not utilized by the system base. The initial retry count field 1126 and the current retry count field 1127 are used to control the number of times automatic instruction retry is executed before a machine error is made to produce a machine failure exception condition. They are loaded with the same number by a Reset Retry Count (not shown herein).

The running process word (RPW), shown in FIG. 11j, is stored in BAR plus 56 of the system base 600 and is used to store the name of the running process with its priority in case of a monoprocessor architecture. The NFS fields 1128 and 1131 respectively are nonfunctional storage fields and may be utilized for any purpose by any facility but is generally not utilized by the system base. The priority level of a running process is stored in the PRI field 1129. An asynchronous trap bit is stored in AB field 1130; whereas an asynchronous trap ring is stored in ARN field 1132. The logical name J, P of the running process in case of a monoprocessor architecture is stored in the J, P field 1133.

An Absolutization Table Pointer word shown on FIG. 11k is located at BAR plus 60 in the system base 600 and is utilized in initial system load to initialize the absolute addresses in the initial system load (ISL) program by adding the contents of BAR to all absolute addresses in the ISL program. The Absolutization Table Pointer 1135 defines the location of an Absolutization Table (not shown). The Absolutization Table Size is shown by the ATSZ field 1134.

The CPU serial number word shown on FIG. 11 (1) is a 4 byte word located at BAR plus 64 and contains the serial number of the CPU in the CPU serial number field 1136.

Figure 11M:
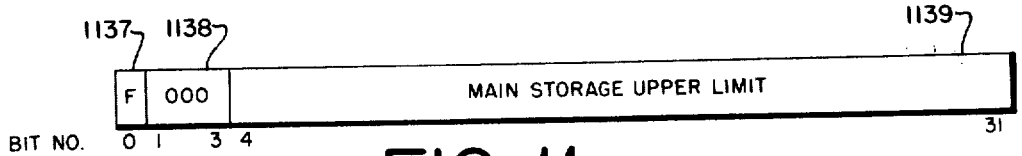

A main storage upper limit word shown on FIG. 11m is located at BAR plus 68 and indicates the main storage upper limit 1139 by providing the absolute address of the last available word in main storage.

Figure 11N:
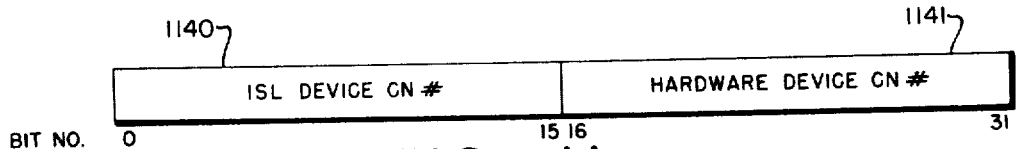
Figure 11O:
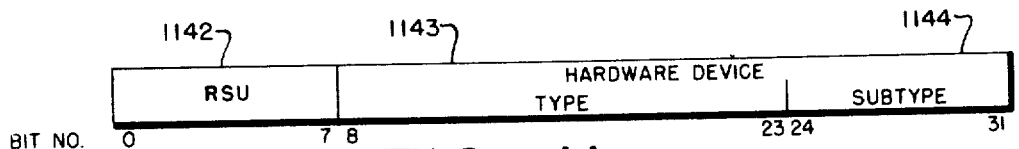
Figure 11P:
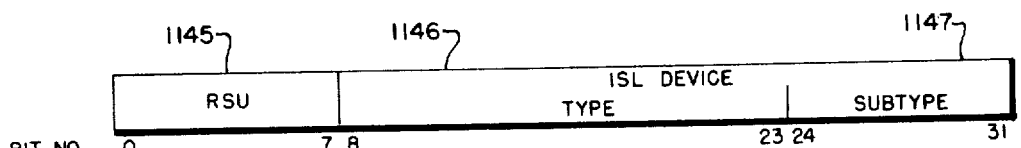
Figure 11Q:
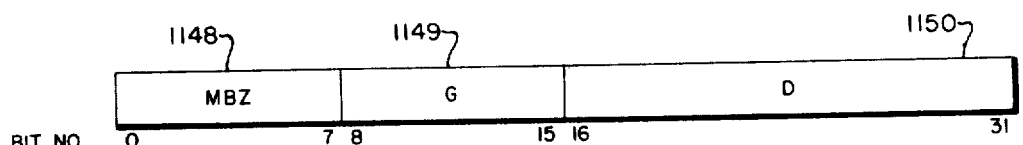
Figure 11R:

At BAR plus 72 there is located a word shown on FIG. 11n for providing the initial system load ISL device channel number (CN) 1140 and the hardware device channel number (CN) 1141.

The type and subtype of a device used in the computer system is shown by a hardware device type word (FIG. 11o) in fields 1143 and 1144 respectively; where the RSU field 1142 is reserved for software. This word is found in the system base at BAR plus 76. A similar word having a similar type format shown on FIG. 11p contains the type and subtype of the device used in the initial system load. This word is located at BAR plus 80.

When the restart button of a computer is pressed, a simulated V-operation is performed on a semaphore and the Ready state is entered. A pointer to this semaphore is found at BAR plus 84 of the system base 600 and is called a restart cell word, and has a format shown on FIG. 11q. The format is similar to the system exception cell described supra and contains the system name G, D of a semaphore in the G field 1149 and D field 1150 respectively. The MBZ field 1148 must be 0.

Where there is more than one processor to the computer system, a word is provided in the system base 600 at BAR plus 88 for multiprocess extension. Details of this word are shown on FIG. 11r.

EXAMPLES OF SYSTEM BASE AND PROCESS CONTROL BLOCK USE

Figure 12:
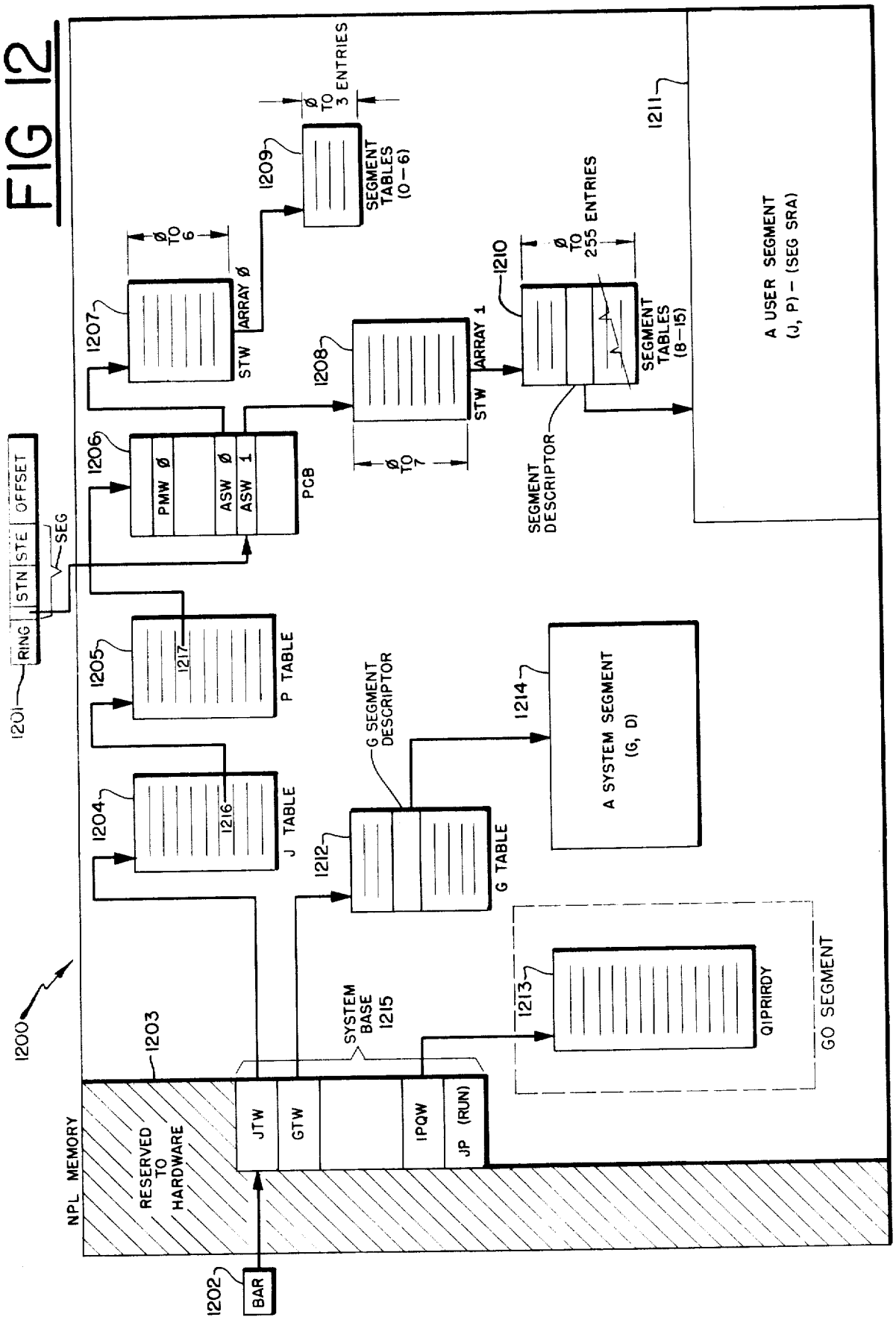
FIG. 12 is a schematic diagram of addressing schemes of user and system segments utilizing the system base and PCB structures.

Referring to FIG. 12 there is shown one example, how the system base may be utilized in combination with the process control block in order to address and access a user segment, a system segment, or a queue of processes ready (Q/PR/RDY) segment. Main memory 1200 has a portion 1203 reserved for hardware use. A boundary address register BAR 1202 separates the system base 1215 from the portion of memory 1203 reserved for hardware. The boundary address register BAR 1202 is utilized to address items in the system base 1215 by adding the contents of the boundary address register to the displacement in 4 byte units of the item desired in the system base. This address then points to the first byte of the item in the system base desired. In FIG. 12 the BAR 1202 is pointing at the J table word (JTW). The J table word, as previously discussed, has a pointer which points to a J table 1204. By indexing to the J number shown on FIG. 5, a J table entry 1216 is obtained. At the J table entry there is a P table pointer which points to the absolute address of the P table 1205. By indexing to the P number (see Fig. 5) within P table 1205 the absolute address of the process control block 1206 is obtained. As previously shown in process control block PCB 1206 there are two address space words ASW 0 and ASW 1. The high order bits of the segment table number field STN in the base register 1201 is used to access one of these two address space words, in this instance ASW 1 which has a segment table word array STWA pointer that points to segment table word array STWA 1208. Together with the segment table number STN of the base register 1201 one of 8 segment table words is accessed in STWA 1208, which points to one of 8 segment tables 1210. The segment table entry STE from base register 1201 is then utilized to make one of 256 entries in segment table 1210 where a segment descriptor is located. The segment descriptor is then utilized to access a user segment 1211. (For greater detail see U.S. Application No. 470,496 filed on 5/16/74 entitled Segmented Address Development and assigned to the same assignee as the instant invention and is hereby incorporated by reference herein).

In order to access a system segment 1214 which is utilized to store semaphores a G table word GTW is utilized in the system base 1215. The address of the G table word is obtained by adding the displacement of the G table word in the system base to the boundary address register BAR 1202. (See FIG. 6). The G table word GTW includes a G table pointer which points to a G table 1212. By utilizing a G number available to the system and indexing in the G table a G segment descriptor is accessed which is utilized to address a system segment 1214.

Similarly the system base 1215 is utilized to access the queue of process ready (Q/PR/RDY) 1213 by locating an internal processor queue word IPQW which points to the Q/PR/RDY segment 1213.

CONTROL UNIT

Figure 13A:
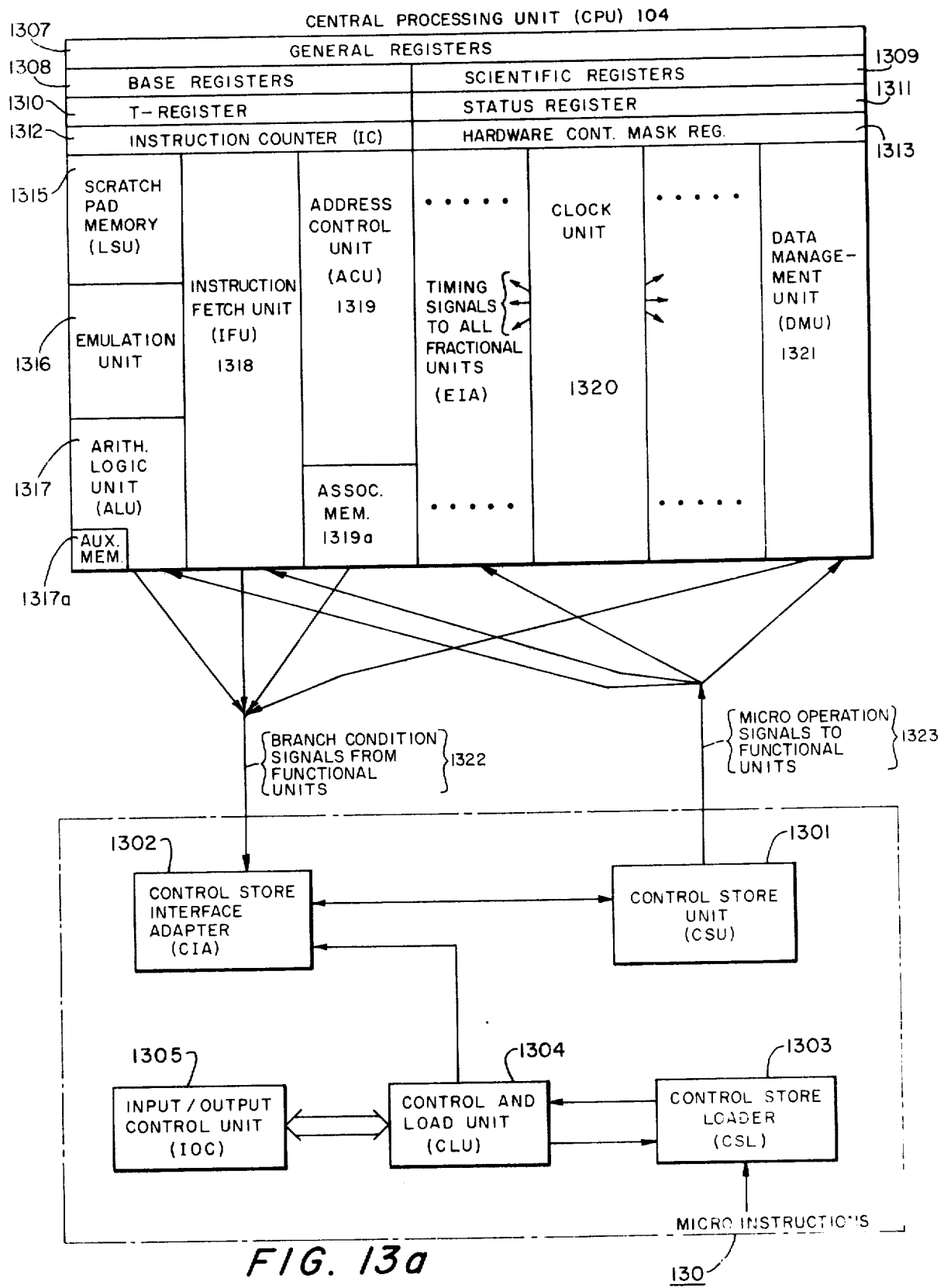
FIG. 13 is a schematic diagram of the control unit.
Figure 13B:
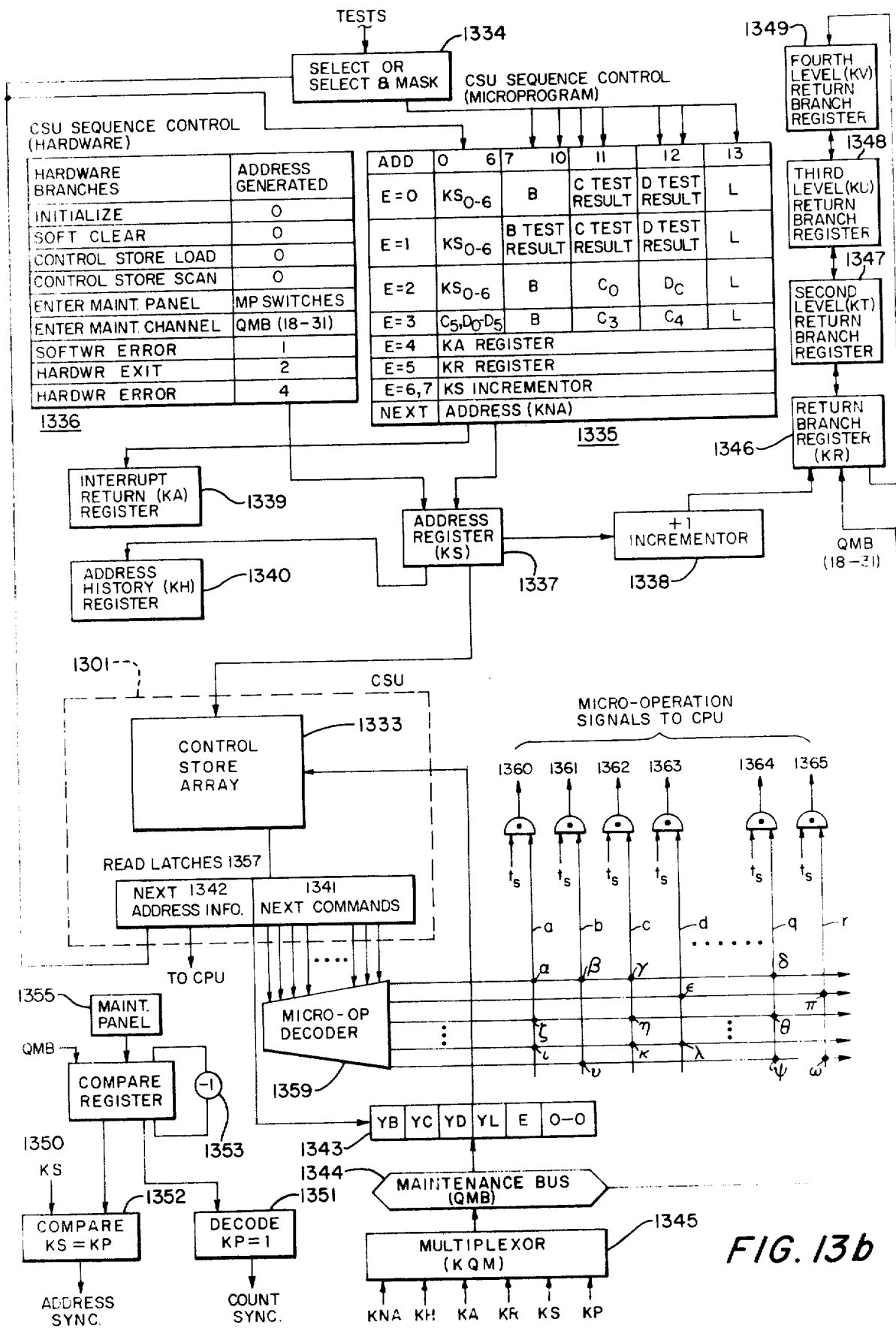
Figure 14A:
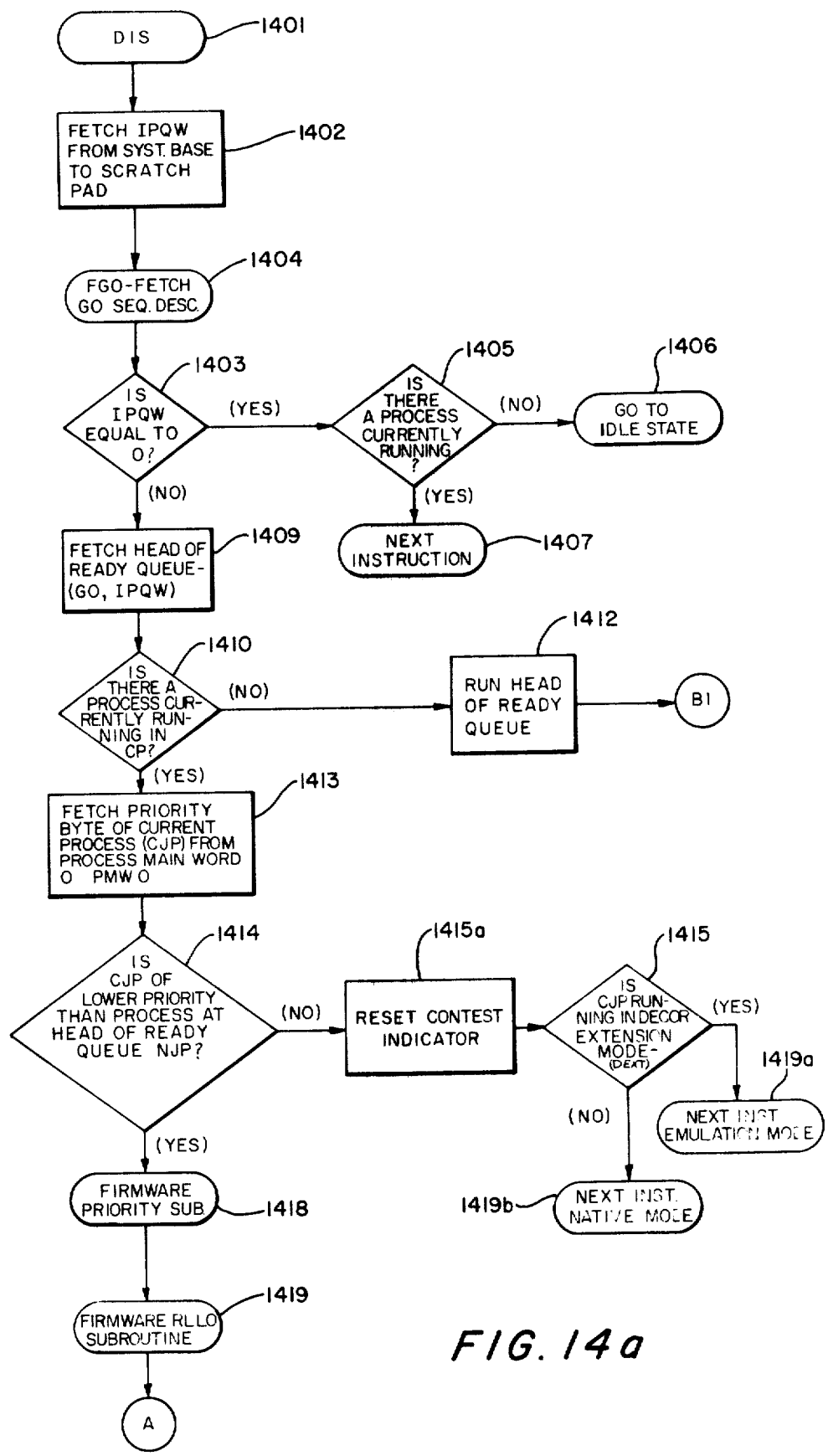
Figure 14B:
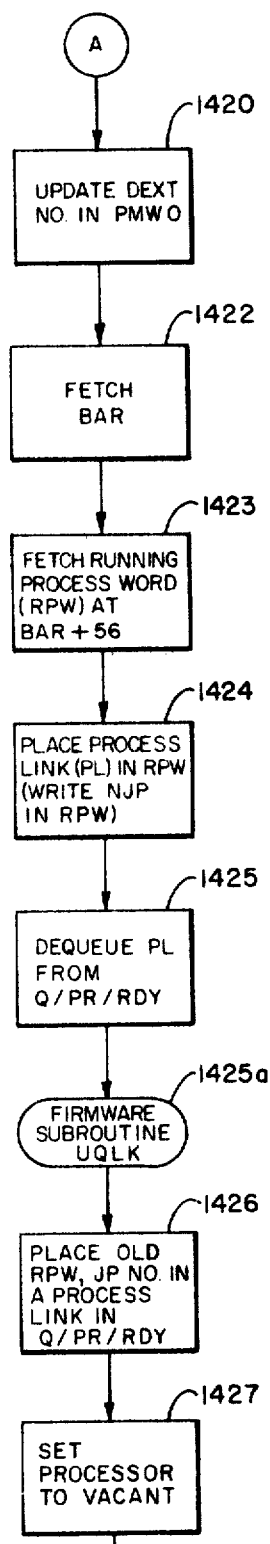
Figure 14C:
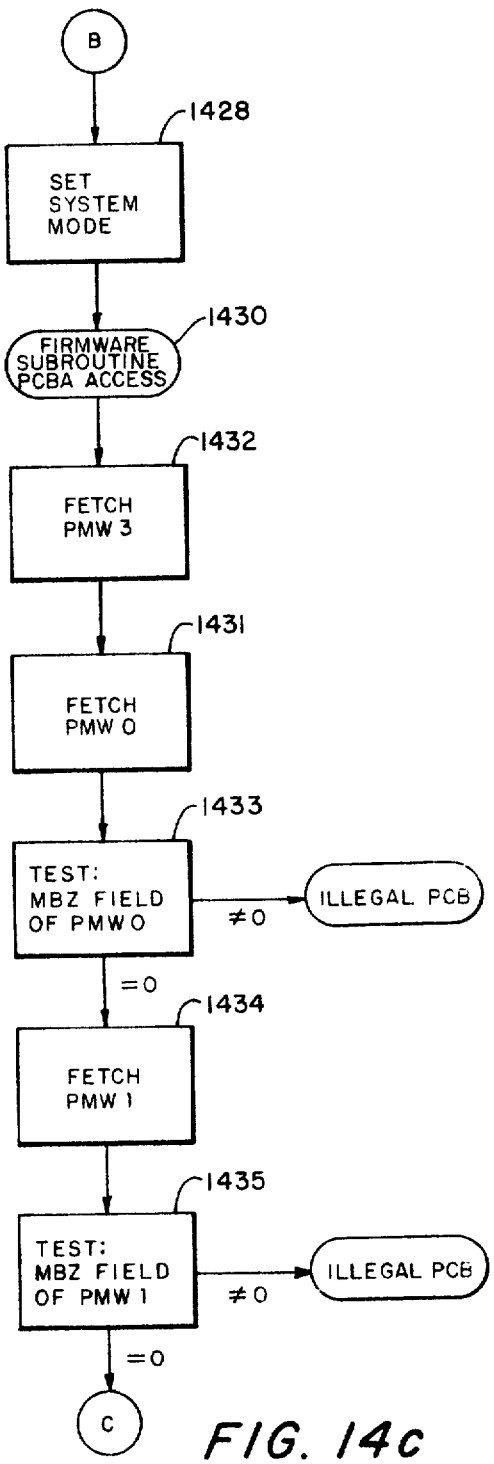
Figure 14D:
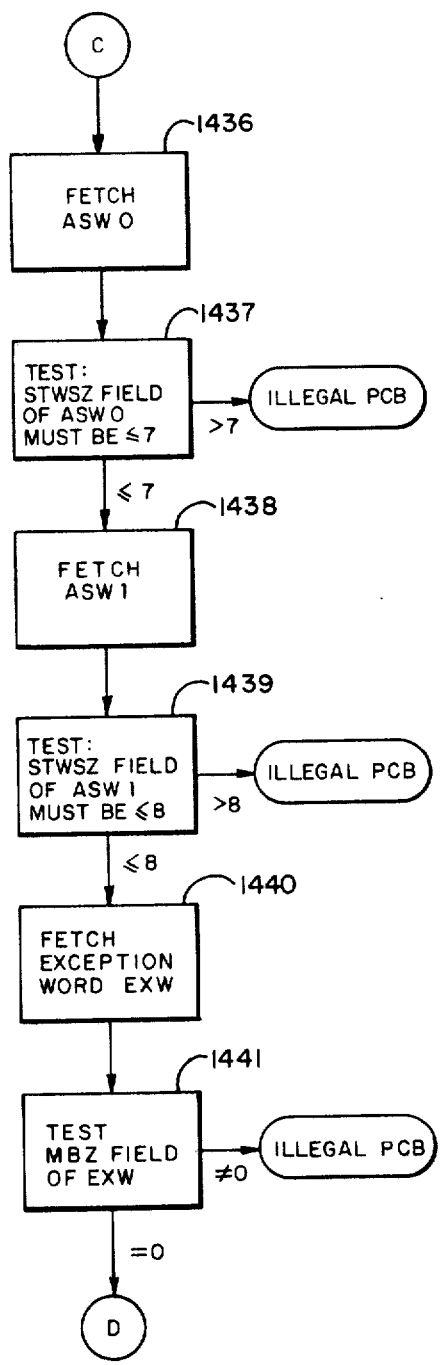
Figure 14E:
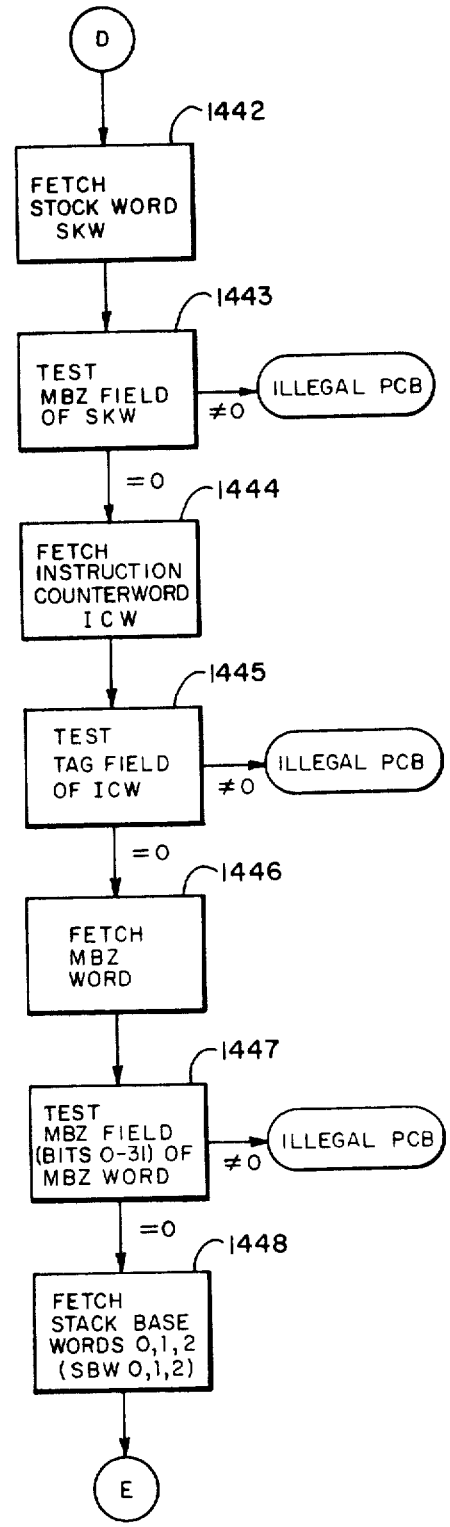
Figure 14H:
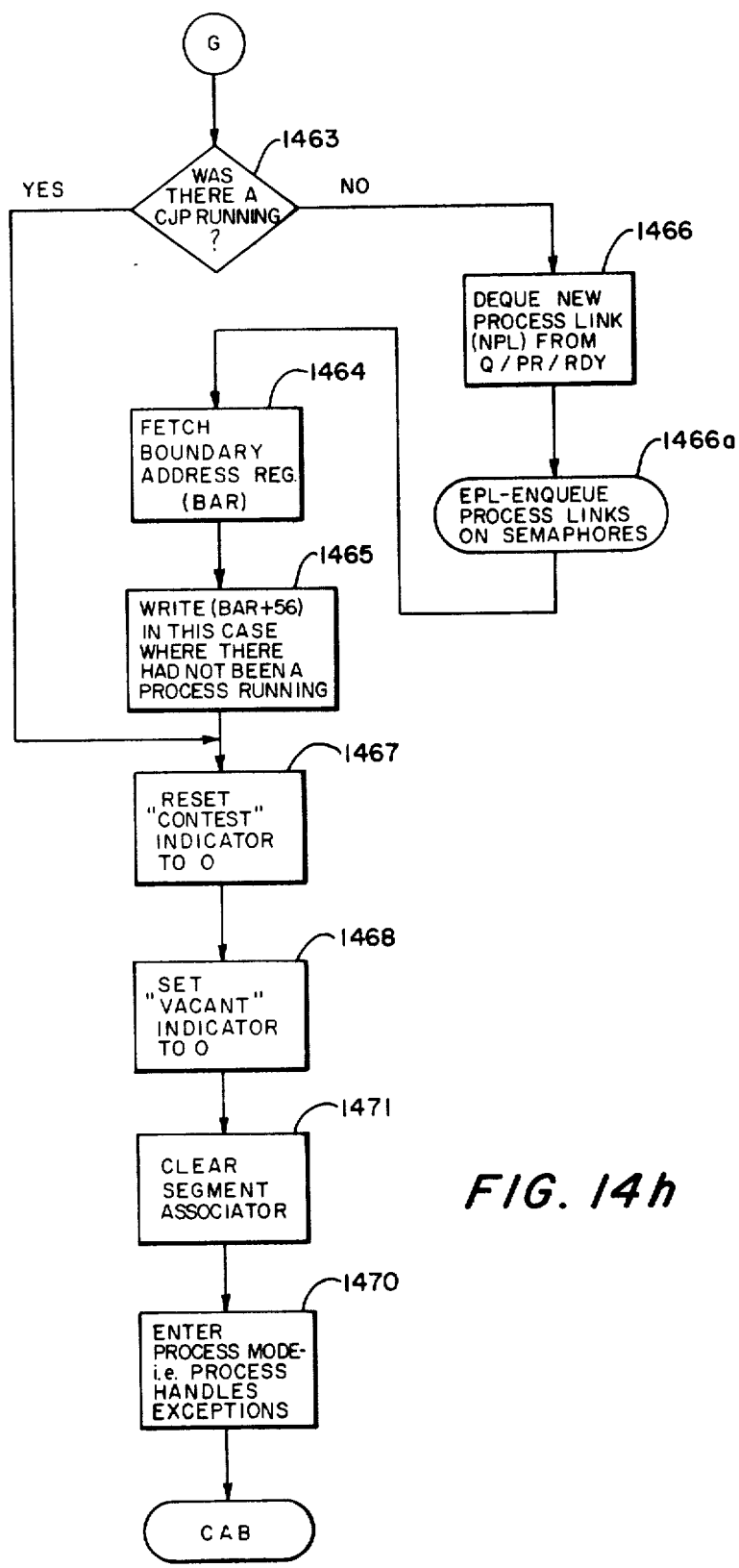
Figures 13C, 14I:
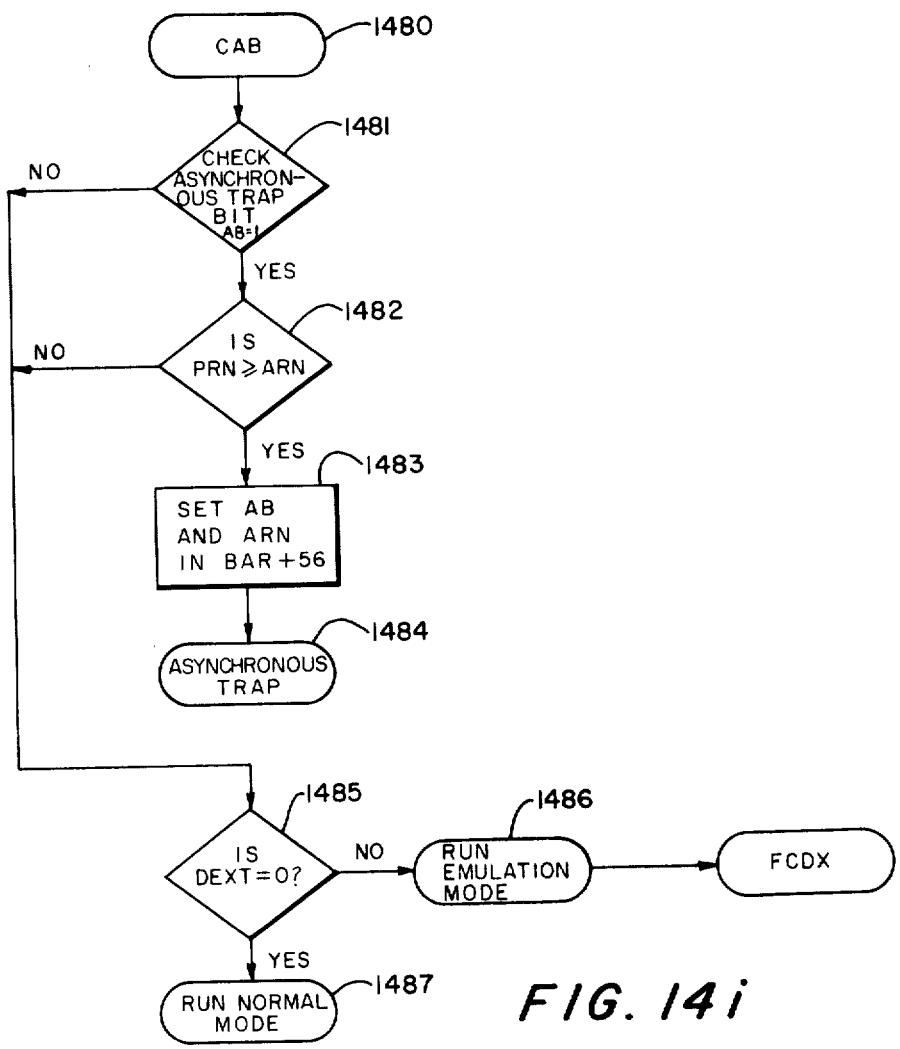

Referring to FIGS. 13a–13c details of the control unit are shown. The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1303 via the control and load unit CLU 1304 and the control store interface adapter CIA 1302. Under normal operating conditions, microprograms are loaded from an external source during system initialization and become a permanent control function of the machine. However the control store unit CSU 1301 has the ability to be reloaded and initialized in a manner that provides for a variety of central processing unit CPU 1306 operational modes. The following modes of operation of the CPU are available under control of the CSU 1301; (a) native mode; (b) emulation mode; (c) concurrent native and emulation modes; (d) diagnostic mode. This capability is possible because the micro-instructions resident in the CSU are the source of micro-operations used to control the operation of all other CPU functional units such as the emulation unit 1316, the arithmetic logic unit ALU 1317, the instruction fetch unit IFU 1318, the address control unit ACU 1319 and the data management unit DMU 1321. Also shown within the central processing unit CPU 1306 are previously described general registers 1307, base registers 1308, scientific registers 1309, T-registers 1310, status registers 1311, instruction counter IC 1312, and hardware control mask register 1313.

Typically the control store unit CSU 1301 is a 9K bipolar integrated circuit programmable read-only memory (PROM) mixed with read/write random access store (RAM). It has a typical 150 nanosecond read cycle and a 450 nanosecond write cycle. Each location of control store stores one 84-bit micro-instruction word (to be later more fully described), and each microinstruction word controls one CPU cycle. As each location of the control store of the control store unit CSU 1301 is read, its contents are decoded by microoperation decoders which provide micro-operation control signals each of which causes a specific operation within the CPU to take place (to be later described in detail).

By grouping locations within each micro-instruction word (to be later described in detail) control store sequences are obtained that can perform a specific CPU operation or instruction. As each instruction is initiated by the CPU, certain bits within the op-code are used to determine the control store starting sequence. Testing of certain flops (not shown) which are set or reset by instruction decode functions allows the control store memory to branch to a more specific sequence when necessary.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. 13b. The CIA 1302 includes logic for control store address modification, testing, error checking, and hardware address generation. Hardware address generation is utilized generally for developing the starting address of error sequences or for the initialization sequence.

The data management unit DMU 1321 provides the interface between the CPU 1306 and the main memory and/or buffer store memory shown on FIG. 1. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control of the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, are directed by CSU micro-operation and logic in the unit. The normal cycling of the ACU depends on the types of addresses in the instruction rather than on the type of the instruction. Depending on the address types the ACU may perform different operations for each address in an instruction. The ACU also contains an associative memory 1319a that typically stores the base address of the 8 most recently used memory segments, along with their segment numbers. Each time a memory request is made, the segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a it is developed by accessing the main memory tables. However, after the base address of the segment is developed, it is stored in the associative memory, along with the segment number, for future reference.

Interfacing with the ACU, IFU, DMU, and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory unit LSU 1315, (sometimes referred to also as the local store unit). It is typically comprised to 256-location (32 bits per location) solid state memory and selection and read/write logic for that memory. The scratch pad memory 1315 is used to store CPU control information and maintainability information. In addition, the scratch pad memory 1315 contains working locations which are primarily used for temporary storage of operands and partial results during data manipulation. Also associated with the ALU 1317 is an auxiliary memory 1317a comprised typically of 64 flip-flops for storing miscellaneous states of the computer system.

The CPU also has a clocking unit 1320 and is essentially 2 clocking systems in 1: the first clocking system generates the timing for the control interface adapter CIA 1302 and the second clocking system generates the timing pulses for the operations of the functional unit within the central processing unit.

Referring now to FIG. 13c there is shown the format of the control store word 1325. The control store word is typically 84 bits wide and is divided into 6 main fields:
 a. sequence type field 1326 (3bits);
 b. branching and/or micro-operations 1327 (23 bits);
 c. constant generation and designation 1328 (14 bits);
 d. data to bus 1329 (8 bits);
 e. micro-operations 1330 (32 bits); and
 f. checking 1331 (4 bits).

The 3-bit E field of the control store word 1325 is used as a sequence control field. There are typically 7 different sequence types and 1 reserved type for the instant computer system. Referring to block 1335 of FIG. 13b, when E field equals binary 0, 1, or 2, the branching field A, B, C, D, and L of micro-instruction 1325 is utilized to generate the next address. The first 6 bits of KS register 1337 is utilized together with the B field, a C test results, the D test results and the L field to provide the next address of the next micro-instruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5 a branch is used to initiate a sub-return from a micro-program subroutine. When used, the contents of the return register KR 1346 are used as the next control store address. The return register 1346 is loaded by issuing a control store command which will load present control store address in KS register 1337 plus 1, from incrementor 1338, into the KR register 1346. A one-level-nesting subroutine ability is provided via the KT return branch register 1347. Every time the KR register 1346 is loaded the old contents of the KR register is transferred to the KT register 1347 every time the micro-program return is called; the contents of the KT register will transfer to the KR register. Third level nesting subroutine ability is provided by the KU register 1340; and fourth level nesting subroutine ability is provided by the KV return branch register 1349. When the E field of the control store word is set to binary 6 the next control store word addressed is equal to the present address in KS register 1337 plus 1 in incrementor 1338. When the E field is set to binary 7 the CSU 1301 enters the diagnostic mode and the next address will be the present address plus 1.

In addition to the sequencing control of branching to the next control store address described above and shown in block 1335, there is hardware generated sequence control shown in block 1336 of FIG. 13b. (Note: Blocks 1335 and 1336 are in actuality hardware registers drawn so as to depict the different forms that the micro-instruction words may take.) The hardware generated branches are overriding conditions (such as errors, initialize, control store scan, etc.) which suppress the E field and force a fixed address into the control store address register KS 1337. The branch is made by forcing an interrupt line high (not shown) for one clock period and storing the address which would have been generated under the control of the E field into the KA interrupt return register 1339. A hardware generated address will be placed into the control store address register. Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt-block flip-flop for those sequences which are under firmware control. Those sequences under hardware control automatically generate a reset of the block-flop at the end of the sequence. The following conditions, listed by priority, exists in this category; (a) control store load; (b) control store scan; (c) hardware error; (d) software error. The remaining hardware conditions do not set the interrupt block-flop but do cause an immediate action to occur when generated. The following conditions listed by priority, exist in this category;
(a) initialize;
(b) soft-clear;
(c) enter maintenance panel;
(d) enter maintenance panel;
(e) hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU address switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenance facility. At the end of the sequence a return is initiated by issuing an E field branch with the E field set to binary 4.

A control store load signal causes the CSU to branch to address binary 0. It also turns off the CSU read-cycle flop (not shown), the system clock 1320, and places the CSU in the load state. In the load state the CSU can be loaded from the control store loader CSL 1303, the IOC 1305, the main memory 102, or the maintenance panel 1355. When loaded from the CSL an automatic scan is generated at the end of the load. When loaded from any other media a scan may be issued by either generating a micro-operation signal or setting the scan switch on the maintenance panel. A control store scan signal causes the CSU to branch to an address binary 0. A control store scan is under hardware control for the duration of the sequence. During the scan the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode a hardware error detected in any CPU functional unit will activate a hardware error line (not shown). The control store sequence generated will test the system conditions to determine the action to be taken. In the diagnostic mode, error conditions which are hardware detectable are visible to microdiagnostics. The microdiagnostics control the action to be taken. A software error signal on the other hand causes the control store to branch the address binary 1. This address is the start of the software error reporting sequence which is under microprogram control.

Referring once again to FIG. 13c the E field 1326 is a 3 bit field for the branch code as previously described. The branching and/or micro-operation field 1327 is comprised of the A, B, C, D, and L fields (also shown on block 1335 of FIG. 13b) wherein the A field is the upper 6 bits of the next address, the B field is the middle 4 bits of next address of the mask field on 64-way branch, the C field is a 6 bit test field for 1 of 64 tests, the D field is another 6 bit test field for 1 of 64 tests, and the L field is the least significant bit. The K field 1328 is a 14 bit field of which 6 bits are for the constant field, 4 bits are for a constant or steering field, and 4 bits are a steering field for a constant. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32 bit field which is coded to generate micro-operation subcommands. The P field 1331 is comprised of 4 bits reserved for checking.

In operation the micro-instruction words are stored in the control store array 1333. During a cycle of operation, the control store array is adressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from difference in cable delays. Further, by decoding subcommands with each unit, those signals which are representative of certain conditions existing within the functional unit are required for the generation of certain subcommand signals do not have to be returned to the CIA unit 1302. A typical decoder unit 1359 is shown in FIG. 13b as receiving various fields from micro-instruction words and generating micro-operation signals $a, b, c, d, \ldots q, r$. A typical micro-operation decoder 1359 recives commands from a micro-instruction word. The field from the micro-instruction word is decoded and sets one of a plurality of lines $s, t, u, \ldots y, z$ high. A matrix is formed by having predetermined control line impedance coupled to the $s$–$z$ lines at points $\alpha, \beta, \gamma \ldots \xi, \omega$. Typically then when the field from a micro-instruction is decoded one of the lines $s$–$z$ goes high. Since the black dots shown in the matrix by Greek letters $\alpha$ through $\omega$ represent impedance coupling between the sets of lines, any electrical signal propagating along any horizontal wire will be coupled through to propagate along the vertical wire $a$–$r$ where an impedance coupling (black dot) is indicated. Each vertical line $a$–$r$ then may be coupled as one input to one each of AND gates 1360–1365. Other input signals may also be coupled to AND gates 1360–1365 including a timing signal $t_s$ from the central timing unit. Accordingly as each timing signal $t_s$ goes high those gates which have all the other input signals high will be enabled and will provide micro-instruction signals to predetermined functional units in the CPU. For example, if a command 1341 from read latch 1357 is decoded and a horizontal line is high the $a, b, c,$ and $q$ vertical control lines will be high and AND gates 1360, 1361, 1362, and 1364, will be enabled as the $t_s$ timing signal is applied to these gates sequentially. Hence the combination in which the vertical control lines are coupled to the horizontal control line at different points represented by the Greek letters $\alpha$ through $\omega$ represent a permanent switching matrix for supplying micro-operation signals to the central processing unit CPU for controlling the functional units within the central processing unit by micro-instructions furnished from the control store array 1333. Thus permanent firmware having an alterability feature can be built into the machine of this invention by merely specifying the sequence of micro-operations that is required as a capability of the computer system.

Under normal conditions data is written into the control store array 1333 via the CPU write-data register also known as the local register YO 1343. A control flop (not shown) defines whether the upper half or lower half of the storage array is to be written. Data from the control and load unit CLU 1304 arrives at the CIA/CSU via the maintenance bus QMB 1344 and is buffered by the storage local register YO 1343 before being written into the control store array 1333. The storage local register 1343 is time shared as both a read and a write local register. The multiplexor KQM 1345 may be controlled by either the maintenance panel 1355 or by microdiagnostics and provides a read out path from the registers connected to it. A compare register KP 1350 is provided for non-functional use and is used mainly for maintenance purposes and is utilized along with compare logic 1352 and decode logic 1351.

DISPATCHER FIRMWARE FOR CONTROL OF PROCESSES

The dispatcher is a firmware/hardware unit whose main purpose is to manage the various queues of processes, and to switch between processes and includes the updating of the queues of processes, the process control blocks PCB's, the running process word in the system base and the register of a new process. It also delivers messages to a process which is actually waiting for it on a semaphore (after a V-operation, a simulated V-operation for the IOC or for the exception handler). It also enqueues a message on semaphore after a P-operation which freed a message link when a process is waiting on the free-link semaphore to deliver its message.

The dispatcher unit further calls on the native mode instructions firmware after the "rolling-in" of a process executing in native mode, or after a "contest" if the current process remains running and is executing in native mode. It also calls on decor extension firmware for:

(a) a temporary call during the rolling-out of a process executing in that decor extension;

(b) a temporary call during the rolling-in of a process executing in that decor extension;

(c) a definitive call at the end of the rolling-in of a process executing in that decor extension; and, (d) a definitive call after a contest if the current process remains running and is executing in that decor extension.

Moreover the dispatcher places the system in the idle loop when there is no running process.

There are several ways of entering or leaving the dispatcher as follows:

(1) The initialization procedure (SIP) provides entry as the last step, (See U.S. Patent Application Ser. No. 528,814 entitled Arrangement for Initializing a Data Processing System, assigned to the same assignee named herein.)

(2) The Process Management Instruction for a Central Processor provides for the entry into the dispatcher via the Start and Suspend Instruction. The Start instruction starts a process and the Suspend instruction terminates a process. (See Patent U.S. Application No. 329,017 filed on Dec. 2, 1974 and entitled Process Management Instruction for a Central Processor also assigned to the same assignee named herein.)

(3) The P and V operations provide for entry into the dispatcher. The P op picks up a message from a semaphore and if no message than the process goes into wait state. (See Patent Application No. 529,256 entitled Process Synchronization Utilizing Semaphores.)

Briefly then, the dispatcher is the main mechanism which manages the processes and accordingly the process control blocks PCB's by deciding which process is to be run and then taking the appropriate action, such as rolling-out the currently running process (i.e. write into the PCB all information relative to the currently running process contained in hardware registers, scratch pad memory, etc.), and rolling-in the new process (i.e. write from the PCB to various hardware registers, scratch pad memory, etc., all information necessary to run the new process.)

The representation of the functions performed by the dispatcher are shown in flow-charts FIGS. 14a-14i. For example, block 1402 of FIG. 14a is a representation of the function performed by the dispatcher wherein a microprogram word is delivered by the control store unit, and upon decoding by decoder 1359 controls the applicable portions of the CPU via an appropriate series of micro-operation signals 1360, 1361, etc. to retrieve the IPQW from the system base in storage subsystem 102, and transfer it to scratch pad memory 1315. Simultaneously the dispatcher fetches 1404 the GO segement descriptor (see FIG. 12) from the G table of segment descriptors pointed to by the G table word GTW in the system base. Bits 16-31 of the IPQW word contain a 16-bit positive integer which is the displacement from the base of the G segment number 0, referred to as the GO segment, to the head (first byte) of the Q/PR/RDY, queue of processes ready. If bits 16-31 of the IPQW word is 0, 1403 the ready queue is considered to be empty. If the ready queue is empty it indicates that there is no process currently waiting in the Q/PR/RDY and the ready-queue is empty. The next question to be decided in decision block 1405 is whether or not a process is currently running in the machine by determining whether or not the Vacant Indicator is set. (The Vacant Indicator is a flip-flop located in auxiliary memory 1317a; it is set when there is no current process CJP running in the processor). If the Vacant Indicator is set (i.e. there is no process currently running) and since it was previously determined that there is no process in the ready-queue waiting to use the processor then the machine goes in the idle state 1406. However if there is a process currently running in the machine, but there is no one waiting to use the machine, the current process accesses its next instruction 1407.

Returning now to decision block 1403, of the flow chart of FIG. 14a if there is a positive integer in the pointer area of the IPQW (i.e. bits 16-31) the head of the ready queue pointed to by the IPQW word in the GO segment is fetched to the scratch pad memory. (Note: To avoid repetition and in the interest of clarity the intermediate functions of the dispatcher in conjunction with the control unit and CPU will be omitted; however it is to be understood that such intermediate functions as previously described by example are present typically.) Up to this point it has been determined that there is some process waiting in the ready-queue. Before further action can be taken it is necessary to determine if there is a process currently running in the central processor. This is determined at decision block 1410 of the flow chart representation and if there is no process currently running in the central processor (i.e. no CJP) the head of the ready queue is run 1412. However if there is a process running in the central processor the dispatcher must determine who has priority — the currently running process or the head of the ready queue? Accordingly therefore the priority byte of the current process (CJP) which is located in the running process word of the system base 600 or in process main word 0 PSMW 0 or PCB 400, is fetched 1413. A decision is then made 1414 as to whether or not the current running process CJP is of lower priority than the new process NJP waiting at the head of the ready queue? (See decision block 1414.) If CJP is not of lower priority than NJP, CJP remains in control of the central processor and the contest indicator is reset 1415. (The contest indicator is always set to 0 except when one or more new processes have been placed on the read-queue since the beginning of the last instruction executed on behalf of CJP thereby creating the possibility of a conflict; under these conditions the contest indicator is set to binary 1). Before the current process CJP is permitted to continue however, and execute further instructions a determination is made whether or not the CJP is running in decor extension mode 1415. If CJP is running in decor extension mode then the next instruction is executed in emulation mode (i.e. decor extension) and if it is not running in decor extension mode then the next instruction is executed in native mode. Returning once again to decision block 1414, if the NJP at the head of the ready queue has a higher priority than the CJP (i.e. its priority number is lower than CJP's priority number, the current running process CJP is "rolled-out" of the machine and the new process NJP is "rolled-in" to the machine. Accordingly a firmware priority PRIQ 1418 directs the enqueueing of the current process CJP into the ready-queue by LIFO priority and by priority number by first "rolling-out" the CJP under the direction of the firmware subroutine RLLO 1419. The RLLO subroutine directs the writing of the information of the CJP that is stored in the general registers, base registers, scientific registers, T-register, status registers, and instruction counter, back into the appropriate storage areas of the process control block PCB in main memory, and it directs the updating of the RUA. Moreover the DEXT number of process main word 0 (PMWO) in PCB 400 is updated 1420.

The new process NJP is now ready to be "rolled-in". The boundary address register BAR is fetched 1422 and the running process word RPW is fetched from address BAR plus 56 of the system base. See block 1423. The name of the new process NJP is next written into the running process word RPW and since the name of the new process NJP was written in the process link PL of the Q/PR/RDY, the name in the process link PL is therefore now placed in the RPW, block 1424. Therefore NJP from the ready-queue now becomes CJP and is entitled to control the central processor and accordingly is no longer waiting in the Q/PR/RDY and must be dequeued by taking its name out of the process link PL of the Q/PR/RDY, block 1425. When this is done the queue of processes ready Q/PR/RDY is updated by the firmware subroutine UQLK, 1425a. Accordingly the JP number of the process which was just taken out of the machine is placed in a process link in the Q/PR/RDY, since it now no longer has control of the machine and must wait for it, 1426. At this point the transformation of giving this control of the central processor to the new process and placing the old process in a ready queue is accomplished and because there is a process (the new CJP) in control of the central processor, the Vacant Indictor is set to 0, 1427; if on the other hand there were no CJP in control of the central processor the Vacant Indicator would be set to 1. At this point the assignment of the processor is complete and a new process has acquired the central processor whereas the old process was placed in a ready queue; however, the new process is not ready to run yet for the hardware of the central processing unit, 1306 of FIG. 13a, such as the general registers 1307, the base registers 1308, scientific registers 1309, the T-register 1310, the status registers 1311, and the instruction counter 1312, must be supplied with control information from the process control block of the new process.

Accordingly the firmware subroutine 1450 controls the CPU and first fetches PMW 3 from the PCB (FIG. 4) to scratch pad memory 1315, and then fetches PMW 0. The MBZ field of PMW 0 is checked 1433 and if it is not binary 0 an illegal PCB exception results. However if the MBZ field of PMW 0 is zero then PMW 1 is fetched 1432. Again the MBZ field of PMW 1 is tested to determine whether or not it is a binary 0. If it is not binary 0 there is an illegal PCB exception; whereas if it is equal to 0 the dispatcher proceeds to C.

Accordingly address space word 0 ASW 0 is fetched from the appropriate space in the PCB and the segment table word size STWSZ is tested 1437 to determine whether or not it is less than 7. If it is greater than 7 an illegal PCB results if it is less than or equal to 7, then ASW 1 is fetched from the PCB, block 1438, and its STWSZ field is tested 1439 to determine whether or not it is less than or equal to 8. If its field is greater than 8 then an illegal PCB results; however, if its STWSZ field is equal or less than 8 the exception word EXW is fetched 1440, and its MBZ field is tested to determine whether or not it is equal to 0. If the MBZ field is not equal to 0 an illegal PCB results whereas if it is equal to 0 the stack word SKW is fetched 1442, and its MBZ field is tested 1443 to determine whether or not it is equal to 0. If the MBZ field is not equal to 0 then an illegal PCB results; whereas if it is equal to 0 the instruction counter word ICW is fetched from the PCB and placed in the instruction counter IC and its TAG field is tested to determine whether or not it is equal to 0, 1445. If the TAG field is not equal to 0 then an illegal PCB results. However if the TAG field is equal to 0 the MBZ word is fetched 1446 and its MBZ field (bits 0–31) is tested to determine whether or not it is equal to 0, 1447. If it is not equal to 0 then an illegal PCB results; whereas if it is equal to 0 stack base words 0, 1 and 2 SBW 0, 1 and 2 are fetched 1448. The contents of the 8 base registers in the base register saving area of the PCB is then fetched 1449 and stored in the machine's base registers 1308. Then the contents of the 16 general registers from the general register saving area of the PCB are fetched 1450 and stored in the machine's general registers 1307. Before fetching the contents of the scientific registers however a check is made of the capability byte of process main word 0 (PMW 0) to determine whether or not scientific mode is being utilized 1451. If scientific mode is being utilized then the contents of the scientific registers from the scientific register saving area of the PCB are fetched and stored 1452. The firmware then proceeds to make a check of the capability byte of PMW 0 to determine whether or not the accounting mode is being utilized 1453. If the accounting mode is being utilized (i.e. accounting bit of capability byte set to binary 1) the accounting words exists in the PCB and the ready time account word RTA is updated. Then the firmware proceeds to determine whether or not the DEXT number is set to 0, 1454. If it is not set to 0 it indicates that the machine may be in emulation mode (i.e. the decor extension capability is being utilized) and accordingly the DEXT number of PMW 0 is checked 1445 to determine whether or not it is greater or less than the DETSZ field of process main word 3 and if it is greater than the DETSZ field an illegal PCB exception 1456 results since the DEXT number is less than the DETSZ field but not equal to zero the machine is performing in legal emulation mode and proceeds to F. Returning to decision block 1454 if the DEXT field is binary 0 then native mode is being performed and the machine fetches STW's, 1457. The residual time out word RTO word of the PCB is fetched 1458 and the process timer is loaded, with the time limit that the CJP may spend in the running state.

Up to this point either (a) a new process NJP has been "rolled-in" to take control of the CPU when there was an old process CJP in the machine and the new process NJP was at a higher priority than the old process CJP or (b) there was no CJP in control of the CPU and the head of the ready queue was run. Briefly under condition (a) the CJP was taken out of the RPW and placed in a process link PL in the Q/PR/RDY, and the NJP is a process link PL in Q/PR/RDY was placed in the RPW thus effectively switching the positions of the 2 processes giving control to the NJP which now becomes the CJP and taking control away from the old CJP. Then the PCB of the NJP was accessed and the information required to run NJP (now the CJP) was placed in scratch pad memory or the array of registers in the ACU.

If there was no CJP in control of the CPU (condition *b*), then the head of the ready queue was run — i.e. the NJP became the CJP because of the dispatcher taking the NJP from the process link PL from the head of the ready queue and placing it in the RPW word. By doing this a process link PL was left empty in the Q/PR/RDY and it is required to take it out.

Accordingly beginning now at decision block 1461 the firmware determines whether or not there was a CJP in control of the CPU and if there was a free process link (FPLS) it was accessed and enqueued and the CJP was written therein. However if there was no CJP in control of the CPU state byte of PMW 0 of the NJP is updated 1460 and again there is a determination whether or not there was a CJP in the machine 1463. If there was no CJP in control of the processor the process link of the NJP (which was in the Q/PR/RDY and is now in control of the machine) is taken out of the Q/PR/RDY 1466 (i.e. dequeued from the Q/PR/RDY) and becomes a free link semaphore FLSP and is now enqueued in the free process link queue (805 on FIG. 9) and becomes a part of the free process link queue 1466a. The contents of the boundary address rgister BAR are fetched 1464 and the running process word RPW and the NJP (now the CJP) located at BAR plug 56 of the system base is updated by placing the NJP identification in the RPW, block 1465. The Vacant Indicator is set to 0 in the case where there had been no CJP. Next the Contest Indicator (i.e. a flip-flop in auxiliary memory 1317a used to indicate a possible conflict in priority between the CJP and a process placed in the ready queue) is set to 0, 1467 and the Segment Associator (AS 132 on FIG. 1) which is a typical content addressable memory is cleared, 1471; then the process mode is entered 1470. (A process mode indicates that exceptions are handled by the process which is operating in the processor rather than by the operating system). The firmware then continues the CAB 1480 and the asynchronous trap bit AB is checked to determine whether or not it is set to binary 1, 1481. If the AB bit is set to binary 1 then a check is made 1482 to determine whether or not the process ring number PRN is greater than or equal to the asynchronous trap bit ARN. (The AB and the ARN are located in the priority byte of the PCB of each process and is meaningful when the process is in the running state; the AB and ARN are obtained from the RPW located at BAR plus 56 of the system base). The AB and ARN in BAR plus 56 of the RPW are reset since the next step 1484 is to proceed to an asynchronous trap routine which would take care of the conditions that cause the asynchronous trap bit or the asynchronous ring number to be set in the first place, and if these were not reset then at the next pass by the firmware it would give an indication that something was wrong where actually there was nothing wrong, and hence would always proceed to the asynchronous trap routine 1484 and would never execute. Going back now to decision blocks 1481 and 1482 if the AB bit is not set or AB bit is set and PRN is not greater than ARN, then the firmware would proceed to determine in what mode the processor would run 13 in the normal mode or in the emulation mode. Accordingly the DEXT number is checked to determine whether or not it is set to 0 and if it is set to 0 the normal mode of the machine is run 1487. However if the DEXT number is not set to 0 the emulation mode is run 1486.

Having shown and described one embodiment of the invention, those skilled in the art will realize that many variations and modifications can be made to produce the described invention and still be within the spirit and scope of the claimed invention.

GLOSSARY OF TERMS

| | |
|---|---|
| Absolute Address | - the physical address of a hardward byte in main memory store. |
| Address Development | - a hardware function which operates on a number of address elements to compute an absolute address which is used to refer to a location in main storage. |
| Addressing | - locating an object by any of a number of virtual, logical, and physical means. |
| Address Space | - the set of logical, segmented addresses corresponding to a process that the CPU is permitted to transform into absolute addresses during execution of that process. |
| Address Space Word | - one of two words in a process control block which point to the segment table word array. The segment table word array defines the segment tables associted with the process. |

-continued

GLOSSARY OF TERMS

| | |
|---|---|
| Address Syllable | - a logical address recognized by CPU hardware, normally in operand of an instruction. |
| Analyzer/Translator | - that part of the static linker that first passes the control language stream to the linker; then, if the control language is error-free, the analyzer/translator converts it to tables and other structures for the static linker to use. |
| Asynchronous Processing | - concurrent activation of more than one process. |
| Auxiliary Memory | - is comprised of 64 flip-flops for storing miscellaneous states of the system and is located in ALU. |
| Base Register | - the primary element in segment addressing, referenced by number in every address syllable. |
| Boundary Address Register | - a visible hardware register that defines the lowest memory address accessible to firmware/software. |
| Call | - see procedure call -Inward Call-Outward Call. |
| Central Process Unit | - a part of a computer that includes circuits controlling the interpretation and execution of instructions. |
| Channel | - a means of communicating between the processor subsystem and a peripheral subsystem. There are two types of channels, physical and logical. A physical channel is the hardware connection between the input/outut control unit IOC and the peripheral control unit PCU. A logical channel is a software communications path between main memory and a single peripheral device. |
| Channel Command Entry | - an instruction in a channel program. |
| Channel Command Word | - an element of a channel command entry. Two channel command words constitute a channel command entry. |
| Channel Program | - a sequence of instructions that cause a specific input/output i/o operation to be performed by a peripheral device. |
| Complementary Code | - a code in some instructions which together with the operation code defines the function of the instruction. |
| Compilation Unit | - the single object-code module that results from compiling or assembling one procedure in any high level language processor. The CU is not executable unit it is linked. |
| Concurrency | - apparent simultaneity. |
| Condition Field | - a 4-bit field in a branch instruction. Each bit of the field corresponds to a setting of the condition code in the status register bits 0 and 1. |
| Contest Indicator | - a hardware structure located in auxiliary memory and indicates a new entry was placed in the ready queue, and there may be possible content for priority. |
| Data Address Space | - the set of logical record addresses accessible by a process through data management; consists of four elements; logical fields, logical records, data base pages, and files. |
| Data Descriptor | - an information structure which is used in indirect addressing and as a description in data manipulation. |
| Decor | - the functional characteristics or architecture of a computer system. |
| Decor Extension Mode | - a mode of operation permitting the operating of the system in emulation mode. |
| Descriptor | - a 32-or-64-bit field used in developing the address of any data field. It is one of many pointers in the addressing scheme of the invention. |
| Descriptor Block | - a data block containing any number and variety of descriptor declarations except semaphore descriptors. No other data is allowed. |
| Device Adapter | - electronics which adapts a specific device to a peripheral controller. |
| Device Adapter Interface | - the interface between a device adapter and its associated peripheral controller(s). |
| Device Control | - a software facility which handles device specific characteristics. |
| Dispatcher | - the firmware responsible for dispatching processes in the CPU. |
| Dispatching | - a field within the instruction format or a data descriptor which provides relative position information within a segment. |
| Displacement Addressing | - a form of direct addressing in which the operand defines a location relative either to the base of the immediate segment or to the current location counter. |
| Dynamic Addressing | - addressing which results in resolution, during execution, of references defined within the process group. |
| Editor | - that part of the static linker that formats and outputs any or all of the information that results from linking a particular procedure. |
| Effective Address | - a logical, as opposed to physical, address consisting of a segment table number, a segment table entry, and a segment relative address. These |

-continued
GLOSSARY OF TERMS

| | |
|---|---|
| | elements show the way to a particular segment segment descriptor, which eventually points to the segment being referenced. |
| Emulation Mode | - operation of a comuter so as to initiate another computer, and appear to operate in theother computer's environment. |
| Exception | - an exception occurs when the hardware detects the existence of some condition that has been specified as requiring special handling. |
| Event | - anything observed in a system by a process which may be of interest to some other rocess. |
| Firmware | - that part of a hardware unit implementation which utilizes a form of micro-programmed control. |
| G, D Name | - the name used by the hardware to refer to a semaphore. G, the G-segment name is the number f the entry in the G-table containing the segment descriptor; D is the relative address in the segment. |
| G-Segment | - a segment containing semaphores which may be addressed using the G, D name form and associated mapping facility (the G-table). |
| G-Table | - a table used for storage mapping (locating a G-segment) when the G, D name form is used. |
| Gating | - a facility for controlling entry to procedures in a (gated) segment through the use of procedure descriptors. |
| General Register | - a 32-bit register available to executing processes which generally holds binary or bit string data. Certain general registers can be used for indexing (GR8 through GR15). |
| Index | - a data structure which is maintained and operated upon by the system. The structure is visible to the user only in terms of a key which he presents for the purpose of making available or positioning to a specific record occurrence. |
| Indexing | - modification of an address by a signed arithmetic value by adding something to something. |
| Index Register | - a general register used for indexing (GR8 through GR15). |
| Indirection | - a method of addressing whereby an address is used to obtain another address, rather than the actual data. |
| Indirection to Base | - the form of indirection whereby a data descriptor containing a base register number and a displacement is found at the address referenced. |
| Indirection to Segment | - theform of indirection whereby a data descriptor containing a segment address is found at the address referenced. |
| Indirect Segment Descriptor | - a type of segment descriptor which contains information for addressing another segment descriptor, rather than a segment. |
| Instruction | - the unit of executionof a central processor visible to a programmer. |
| Instructin Counter | - a register associated with an executing process which contains the segmented address of the next instruction of the procedure being executed. |
| Interleave | - sequential accessing of memory modules to reduce memory access time. |
| Interrupt | - the discontinuance of a process in the system due to an event occurrence. |
| Interrupt Process | - a process which is activated in response to an interrupt. |
| Inward Call | - when one procedure execution in one ring number calls another procedure to execute in a lower ring number. |
| I/OController | - a unit which provides the basic control for a specific I/O subsystem. |
| I/O Processor | - potentially asynchronous system processes which deal primarily with the movement of data between peripheral storage or I/O devices and main storage. |
| J.P. Tables | - a collection of logical addresses for locating a process control block. |
| Job | - a unit of work for the system. |
| Job Control Language | - a language for describing a job and its component parts. |
| Job Step | - the major subdivision of a job leading to the execution of a program defined by a JCL statement. |
| Job Step Table | - a system table used to map the first part of a process name, i.e., to locate the process group table. |
| Linked Module | - the output of the static linker. It is a consolidated group of compilation units (CU) whose cross-reference were resolved by the static linker. |
| Linking | - see static linking. |
| Logical Channel | - see channel. |
| Logical Processor | - the collection of hardware resources and control information necessary for the execution of a process. |
| Main Storage | - all addressable storage from which instructions can be executed or from which data can be loaded directly into registers. |
| Magnetic Tape | - the lements of the peripheral subsystem related |

-continued

| | GLOSSARY OF TERMS |
|---|---|
| Controller | to magnetic tape devices. |
| Mass Storage Controller | - the elements of the peripheral subsystem related to mass storage devices. |
| Memory Management | - operating system facilities for the allocation, relocation, and disallocation of physical memory. |
| Message | - information transmitted from a source or to a destination—neither being a file. |
| Microinstruction | - same as microinstructin word, and control store word. |
| Micro-program | - a set of machine codes used to implementthe contract functions of a processor. |
| Multiplex | - to share a hard resource, such as memory, usually by time division. |
| Multi-programming | - the concurrent execution of two or more programs by a single computer. |
| Native Mode | -operation of a computer in its native environment. |
| Offset | - in address development, the number of bytes after the beginning of the segment at which an addressed part of the segment starts. |
| Operating System | - a system of basic software designed to support the efficient operation of user softward. |
| Outward Call | - when one procedure executing in one ring number call another procedure to execute in a higher ring number. |
| Peripheral Control Unit | - a stand-alone micro-programmed processor which executes channel programs to perform I/O operations. |
| Peripheral Subsystem Interface | - a standard interface used for transfer and control between free-standing periheral control units and I/O control units. |
| Physical Channel - see channel. | |
| Physical Data Structure | - a complete difinition of the organization of data as it is physically recorded on media. |
| Physical I/O | - that part of the operating system which initiates and controls the transfer of data between memory and peripheral or terminal devices. |
| Physical Storage | - hardware used for the storage of data. It is composed of varius types of recording media and the recording/reading hardware. |
| P-operation | - a macine instruction involving a semaphore which causes a process to enter the wait state or to receive a message. |
| Privileged Instruction | - an instruction which must be executed in ring 0. |
| Procedure | - a named software funtion or algorithm which is executable by a processor without concurrency: a Fortran subroutine, a Cobol program, a PL/1 internal procudure. |
| Procedure CAll | - a mechanism for creating a stack frame within a stack segment. |
| Procedure Descriptor | - a word contaning the location and entry point of a procedure. |
| Procedure Segment | - the type of segment whose contents represents a procedure, procedures, or part of a procedure. |
| Process | - the ordered execution of instructions without concurrency by a processor, either central or i/o. |
| Process Address | - the memory addresses which may be referenced or to which control may be transferred during a particular process. |
| Process Control Block | - a data structure (hardware defined and recognizable) that contains information needed to specify the state of a process at any given time. |
| Process Group | - a related set of processes, usually those necessary for the performance of a single job-step. |
| Process Group Builder | - that part of the static linker whose actions yield the linked module. |
| Process Group Loader | - an operating system facility that makes final resolutions in a linked module to create an executable process group then it loads the process group into memory and starts its execution. |
| Process Group Table | - see P Table. |
| Process Link | - an entry in a ready process or waiting process queue |
| Process State | - the dynamic condition of a CPU process e.g., running, ready, waiting, or suspended. |
| Process Switch | - the hardware function that disassociates one process from the central processor and associates another. |
| Process Synchronization | - the functions that act to coordinate the asynchronous activity among processes. These functions generally involve semaphores and the P and V operations. |
| Processor | - a unit capable of receiving data, manipulating it, supplying results, and controlling its sequence of operations in response to stored programs: short for central processor, generic for central processor, peripheral processor, or hardware/software processor. |
| Program | - the specification of the procedural and associated information necessary to solve a problem, i.e. the ordered collection of instructions which is executed by the computer and operates on data to perform a user's job or some phase of that job. |
| Program Execution | - the activity of process is conformance to program specification. |
| Protection | - the function, enforced by hardware and software, |

-continued

GLOSSARY OF TERMS

| | |
|---|---|
| | of preventing processes from interfering with each other or sharing each other's address space in an unauthorized manner. |
| P-Table | - a hardware defined data structure containing entries each pointing to the origin of a process control block The P-table entries point to the total set of PCB's comprising a process group at any given time. Also called process group table. |
| Q/PR/RDY | - queue of processes ready i.e. a ready-queue |
| Queue | - an ordered list of entities awaiting information, process or availability. |
| Ready State | - a process state in which no processor is associated but all necessary resources, except a processor, are available for changing to the running state. |
| Relative Address | - the incremental/decremental location of some object relative to another. |
| Relocation | - movement of a segment from one location in main storage to another including the adjustment of all required references to its previous location. |
| Return | - the function and operations ncessary to resume the action of the procedure at a point immediately following the point where it entered some other procedure. |
| Ring | - a protection attribute of a segment that restricts the read, write, and execute access of process to that segment. A level of privilege of a process for read, write or execute. |
| Rolling-in | - performing the operation necessary to give control of a processor to a new process. |
| Rolling-out | - performing the operations necessary to take away control of a processor by a process. |
| Running State | - the dynamic condition of a process (connected to a CPU) that is executing. |
| Scratch Pad Memory | - 256 locations in ALU for storing CPU control information-also known as a local store unit. |
| Scheduling | - determining the sequence of operations. |
| Scientific Registers | - 64-bit register used in the manipulation of binary floating point numbers. There are four Scientific registers in the invention when the system has the scientific option. |
| Segment | - a continuous main memory space treated as a unit. |
| Segmentation | - the use of a division of main memory into logical groupings called segments rather than into a single linear store. |
| Segment Base | - the current origin of the segment. This is one pof the fields in a segment descriptor word. |
| Segment Descriptor | - entry in a segment table defining the characteristics of a segment or pointing to a segment descriptor. |
| Segmented Address | - see effective address. |
| Segment Number | - the identification of a particular segment consisting of a segment table number (selecting one of the segment tables of the process) and a segment table entry of that chosen table. |
| Segment Relative Address | - during address development, the final value to be added to the segment base to obtain the absolute address. |
| Segment Table | - a table containing descriptors used to establish the ddressability of a process to its segments. The collection of segment tables of a process defines the address space for that process. |
| Segment Table Entry | - an item in a segment table. Each segment table entry is a segment descriptor. |
| Segment Table Word | - an entry in a segment table word array pointing to the segment tables of a process. The array is pointed by by one of two addresses space words in the process control block. |
| Semaphore | - data structures used to control communication between processes. |
| Semaphore Block | - a data block containing only semaphore descriptor declarations. |
| Stack | - a mechanism that accepts, stores, and allows retrieval of data on at least-in-first-out basis. Comprised of a number of contiguous portions called stack frames. |
| Stack Active Area | - the portion of the current stack frame that holds a pointer to the saving area, the caler's instruction counter, parameter space and local variables—in short, the data of the current frame most likely to be useful to execution of the caled procedure. |
| Stack Base Wods | - a group of three words in a process control block which contain he segmented address of the stack segments for rings 0, 1, and 2 associated with the process. |
| Stack Frame | - a contiguous part of the stack segment holding the data stored for a single procedure cal. |
| Stack Operations | - the push-down and pop-up operations of storing and retrieving information to/from the stack. In practice, manipulation of the pointers used to reference the information stored in the stack. |
| Stack Overflow | - the action of attempting to store more information |

-continued

| | GLOSSARY OF TERMS |
|---|---|
| | into the stack then, the available space can hold. This is detected by hardware. |
| Stack Register | - see T register. |
| Stack Segment | - the segment of a process that contains its stack. |
| Static Linking | - an intermediate step between compiling a source procedure and executing the object form of that procedure; linking resolves the external references made to and from that procedure. |
| Status Register | - an 8-bit register which specifies the status of the procedure currently being executed. |
| Swapping | - releasing the main memory space occupied by a segment by writing the segment out to secondary storage. The actual write to secondary storage may be suppressed if the segment has not been modified since the last time it was read in. |
| Synchronization | - having a fixed relationship in time; synchronized execution of two or more processes |
| System Base | - a fixed area in main memory which acts as a root for all information structures. |
| Task | - the smallest unit of user-defined work consisting only of a single stream of non-concurrent instructions. |
| T Register | - a software visible hardware register which contains the segmented address of the top of the procedure stack. |
| Unit Recorded Controller | - the elements of the peripheral subsystem related to unit record devices such as card equipment, paper tape equipment, and line printers. |
| User Process Group | - the internal representation of any job step, as opposed to a system process group which exists independently of any job. |
| Vacant Indicator | - a hardware structure that indicates that the process which had control of the CP has suspended itself i.e. no CJP in the CPU. Located in Auxiliary Register, of the ALU. |
| Virtual Memory | - an addressing concept that allows a programmer to code without regard to physical memory size; virtual memory manager automatically manages the exchange of segments between main memory and secondary storage. |
| V-Operation | - a machine instruction intended for interprocess signaling the completion of an event. A V-OP operates on a designated semaphore. |

| | ABBREVIATIONS |
|---|---|
| ACU | - address control unit |
| ALU | - arithmetic and logic unit |
| AS | - address syllable |
| ASW | - address space word |
| BAR | - boundary address register |
| BCD | - binary coded decimal |
| BR | - base register |
| CCE | - channel command entry |
| CCU | - channel control unit |
| CMRN | - the callers maximum ring number |
| CCW | - channel command word |
| CET | - current state entry time |
| CIA | - control store interface adapter |
| CJP | - currently executing process |
| CPU | - central process unit |
| CU | - compilation unit |
| CSU | - control store unit |
| D | -displacement |
| DMU | - data management unit |
| DA | - device adapter |
| EAR | - effective address ring |
| EXW | - exception word |
| GR | - general register |
| GTW | - G-table word |
| IC | - instruction counter |
| IFU | - instruction fetch unit |
| I/O | - input/output |
| IOC | - input/output controller |
| IPQW | - internal process queue word |
| IR | - index register |
| ITBB | - indirect to base register |
| ITS | - indirect to segment |
| J | - job |
| JCL | - job control language |
| JTW | - J-table word |
| LCT | - logical channel table |
| LIFO | - lost-in-first-out |
| LSU | - local store memory or scratch pad memory |
| MBZ | - must be zero |
| MOS | - metal oxide semiconductor |
| MAXR | - the maximum ring number at which a procedure may execute MAXR is found in the segment descriptor of $SEG_{EP}$. |
| MSC | - mass storage controller |
| MTC | - magnetic tape controller |

-continued

| ABBREVIATIONS | |
|---|---|
| NFS | - non-functional status |
| NPRN | - new process ring number |
| NJP | - new process replacing the currently executing process |
| PCB | - process control block |
| PCT | - physical channel table |
| PCU | - peripheral control unit |
| PL/I | - programming language/one |
| PMW | - process main word |
| Q/PR/RDY | - queue of processes ready |
| RD | - read ring |
| RHU | - reserved for hardware use |
| RPW | - running process word |
| RSU | - reserved for software use |
| RTA | - ready time accounting |
| RTO | - residual time out |
| SBW | - stack base word |
| SEG | - segment number |
| SKW | -stack word |
| $SEG_{EP}$ | - the segment which contains the entry point as found in the procedure descriptor |
| $SEG_{PD}$ | - the segment which contains the procedure descriptor |
| SR | - scientific register |
| SRA | - segment relative address |
| STE | - segment table entry |
| STN | - segment table number |
| STR | - status register |
| STW | - segment table word |
| STWA | - segment table word array |
| T | - T-register (stack register) |
| URC | - unit record controller |
| WR | - write ring |
| WTA | - waiting time accounting |

APPENDIX I

The following information is provided as background information to better understand the invention, although such information is not necessary to practice the invention.

Further Information with Respect to FIG. 1

(1) Emulators (112)
  (a) Emulators are found in the IBM System/370. See page 265 of a book entited Computer Organization and the System/370, by Harry Katzan, Jr., in 1971 by VanNostrand Reinhold Company of New York, New York.
  (b) An emulator is also described in the following U.S. patent No. 3,374,466 issued 3/19/68;

(2) Computation Unit (111)
  (a) Computational units are well known in the art and are also known as Arithmetic and Logic Unit (ALU). See the following U.S. Pat. No. 3,404,378 issued 10/1/68;

(3) Control Unit (130)
  (a) Typical control units are described in a book entitled *Microprogramming: Principles and Practices*, by Samir S. Husson, published in 1970 by Prentice-Hall Inc., of Englewood Cliffs, New Jersey; see also a book entitled *Computer Organization and Microprogramming*, by Yao-Yaohan Chu published in 1972 by Prentice-Hall Inc., of Englewood Cliffs, New Jersey. A typical state of the art control unit is disclosed in the following U.S. Pat. No. 3,391,394 issued 7/2/68;

(4) Buffer Store (110)
  (a) See Ser. No. 295,301 now issued into U.S. Pat. No. 3,820,078 on 6/25/74.

(5) Main Memory Synchronizer (109) See U.S. Pat. No. 3,449,723 issued 6/10/69.

(6) Associative Memory (132)
  (a) Associative memories are well known in the prior art, see pages 273-284 of the above referenced book on *Computer Organization and Microprogramming*, by Yao-Yaochan Chu; see also the following U.S. Pat. No. 3,648,254 issued 3/7/72;

(7) Address Control Unit (ACU) 131
  (a) See Ser. No. 424,239 now matured into U.S. Pat. No. 3,916,385 on 10/28/75.

(8) Input/Output Control Unit (105)
  (a) A typical I/O control unit is disclosed in the following U.S. Pat. No. 3,593,299 issued 7/13/71;

(9) Peripheral Control Unit (106)
  (a) See Chapter 10 of the above referenced book on *Computer Organization and Microprogramming*, by Yao-Yaohan Chu.
  (b) A typical peripheral control unit including device adaptor which is further disclosed in the following U.S. Pat. No. 3,753,236 issued 7/14/73;

(10) Device Adapters (107)
  (a) See U.S. Pat. No. 3,573,741 issued 4/6/71.

(11) Main Memory (102)
  (a) See Ser. No. 295,417 now matured into U.S. Pat. No. 3,796,996 on 3/12/74.

BACKGROUND INFORMATION RELATIVE TO FIG. 13a

In addition to the references already cited in this Appendix, the following are also included:

(12) General Registers (1307-1311)
  (a) Registers are well known in the computer art. A typical one is disclosed in the following U.S. Pat. No. 3,108,193 issued 10/22/63;

(13) Hardware Control Mask Register (1313)
  (a) See U.S. Pat. No. 3,351,915 issued 11/7/67;

(14) Instruction Counter (1312)
  (a) Instruction counters are well known in the computer art. See for example U.S. Pat. No. 3,162,841 issued 12/22/64.

(15) Scratch Pad Memory (1315)
  (a) A typical Scratch Pad Memory is disclosed in the following U.S. Pat. No. 3,351,909 issued 11/7/67.

(16) Instruction Fetch Unit (1319)
  (a) Instruction fetch units are well known in the computer art. See for example pages 339-347 of the above referenced book on *Microprogramming: Principles and Practices,* by Samir S. Husson.

(b) A typical instruction fetch unit is disclosed in the following U.S. Pat. No. 3,609,700 issued 9/28/71;

(17) Clock Unit and Timing Circuits (1320)
 (a) The computer art is replete with clock and timing circuits. The following U.S. patent discloses a typical clock and timing circuit: U.S. Pat. No. 3,254,329 issued 5/31/66.

(18) Data Management Unit (1321)
 (a) See the following U.S. patent for a typical data management and control system: U.S. Pat. No. 3,639,912 issued 2/1/72;

(19) Control Store Unit (1301)
 (a) Control stores are well known in the computer art. See prior reference books entitled Microprogramming: Principles and Practices, by Samir S. Husson and Computer Organization and Microprogramming, by Yao-Yaohan Chu.
 (b) The following U.S. patent discloses a typical control store: U.S. Pat. No. 3,469,247 issued 9/23/69;

(20) Control Store Interface Adapter (1302)
 (a) See the following U.S. Pat. No. 3,868,649 issued 2/25/75;

(21) Control Store Loader and Control and Load Unit (1303, 1304)
 (a) Program and microprogrammed loaders are well known in the computer art. See for example pages 284-294 of the above referenced book on *Computer Organization and Microprogramming,* by Yao-Yaohan Chu.

(22) Firmware Computer
 (a) The following U.S. patent further disclosed a typical microprogrammed computer processor including microprogrammed control unit: U.S. pat. No. 3,656,123 issued 4/11/72.

We claim:

1. In a multi-program computer system for automatically executing a series of instructions, said computer system comprising a plurality of data processing resources including at least one central processing unit (CPU), at least one main memory for storing a plurality of procedures and a plurality of associated process control blocks, and at least one peripheral unit, said computer system for executing said plurality of procedures, each procedure being a predetermined series of instructions, said procedures being in any one of a plurality of states, each of said plurality of procedures being associated with a maximum ring number (i.e. minimum level of privilege) each procedure being further associated with at least one process control block, said computer system further including a dispatcher for determining the state of said procedures and assigning said resources to said selected ones of said procedures, at least a first one of said procedures being in a running state on said CPU, said running state being the state of said first one of said procedures in relation to the computer system wherein the CPU and data processing resources are assigned to said first one procedure by said dispatcher, at least a second one of said procedures being a ready procedure which is in a ready state, said ready state being the state of said ready procedures in relation to said data processing system which is ready for the ordered execution of a second predetermind series of instructions comprising said ready procedure and which ready procedure can assume said running state whenever the data processing resources such as the CPU, main memory and peripheral units which are necessary to the ordered execution of said second predetermined series of instructions comprising said ready procedure are assigned to said ready procedure by said dispatcher, at least a third one of said procedures being a wait procedure which is in the wait state, said wait state being the state of said wait procedure in relation to said computer system which is not ready for the ordered execution of a third predetermined series of instructions comprising said wait procedure and is awaiting the occurrence of an event to be responded to by said wait procedure, and wherein said wait procedure cannot assume the running state even if said data processing resources were made available to said wait procedure by said dispatcher, at least a fourth one of said procedures being a suspended procedure which is in the suspended state, said suspended state being the state of said suspended procedure in relation to said computer system which is not ready for the ordered execution of a fourth predetermined series of instructions comprising said suspended procedure is not awaiting the occurrence of an event which must be responded to by said suspended procedure, each of said procedures further having a procedure name by which each procedure is identified, said main memory further including pushdown stack structures for storing a plurality of coded signals indicative of information stored in groups in said stack structures, said stack structures being accessed when said computer system enters an interrupt mode, said stack structures having a top and bottom of the stack and being associated with a T register for storing stack-coded signals for indicating the top of the stack, and wherein the last group of information stored in said stack structure is stored at the top of the stack indicated by said T register, said groups of information being accessed in response to said T register from the top of the stack thus providing a last-in-first-out (LIFO) access to information, each of said stacks being associated with an address spaced bounded by a stack segment having adjustable bounds and each of said stack segments having a predetermined level of privilege (i.e. ring number) that is required for access to said stack segment by any of said procedures, a virtual processor for determining the location of said stack segments comprising:

(a) first means responsive to said dispatcher and one of said process control blocks and associated with a selected one of said procedures for storing coded first signals for indicating the state of said selected one of said procedures;
 (b) second means, responsive to said first means for storing second coded signals for indicating a selected name and address of said selected one of said procedures associated with said first means;
 (c) third means addressed by said second means for storing third coded signals for indicating a first predetermined portion of the address of said first means;
 (d) fourth means addressed by said second means for storing third coded signals for indicating a second predetermined portion of the address of said first means;
 (e) fifth means, responsive to said third and fourth means, for combining said third and fourth coded signals of said first and second predetermined portions of the address of said first means, whereby an absolute address of said first means is obtained; and,
 (f) stack base work means in said first means addressed by said fifth means each stack base word means associated with a predetermined one of said stack segments, each of said stack base word means for storing fifth coded signals for indicating the segmented address of the first byte of its associated stack segment, and for thereafter accessing said stack segment.

2. The computer system as recited in claim 1 wherein said stack base word means is further comprised of at least three stack base words numbered 0, 1 and 2 respectively, and wherein each stack base word is associated with at least three stack segments numbered 0, 1 and 2 respectively and wherein stack segment 0 has the greatest level of privilege, stack segment 1 has the second greatest level of privilege and stack segment 2 has the third greatest level of privilege.

3. The computer system as recited in claim 2 including registers for indicating the state of a selected one of said procedures currently in control of said CPU.

4. The computer system as recited in claim 3 including access checking mechanism for supervising transfer of control of said CPU from a first selected procedure (i.e. caller) having a first ring number indicative of a minimum level of privilege associated with said caller, to a second selected procedure (i.e. the callee) having a second ring number associated with said callee indicative of a minimum level of privilege associated with said callee.

5. The computer system as recited in claim 4 including sixth means for checking the callers' right to call the callee.

6. The computer system as recited in claim 5 including seventh means responsive to said sixth means for comparing the callers' ring number to the callees ring number.

7. The computer system as recited in claim 6 including eighth means responsive to said seventh means for permitting transfer of control of said CPU from said caller to said callee when the ring number of the caller is greater than the ring number of the callee.

8. The computer system as recited in claim 7 including ninth means also responsive to said seventh means for denying transfer of control of said CPU from said caller to said callee when the ring number of said caller is less than the ring number of the callee.

9. The computer system as recited in claim 1 including asynchronous trap means for trapping procedures having faults and further including in said first means asynchronous trap bit means AB for invoking, when set, the asynchronous trap means.

10. The computer system as recited in claim 9 including an asynchronous trap ring number mechanism and further including asynchronous trap ring number means ARN for invoking, when set, said asynchronous trap ring number mechanism.

* * * * *